(12) United States Patent
Dorosenco et al.

(10) Patent No.: US 9,553,754 B1
(45) Date of Patent: Jan. 24, 2017

(54) POST DISTORTION IN SATELLITE COMMUNICATIONS

(71) Applicant: QUALCOMM Incorporated, San Diego, CA (US)

(72) Inventors: Alexander Dorosenco, El Cajon, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/850,850

(22) Filed: Sep. 10, 2015

(51) Int. Cl.
  *H04L 27/34* (2006.01)
  *H04L 27/36* (2006.01)

(52) U.S. Cl.
  CPC ......... *H04L 27/3411* (2013.01); *H04L 27/366* (2013.01)

(58) Field of Classification Search
  CPC ........................... H04L 27/3411; H04L 27/366
  USPC .................................................. 375/271, 316
  See application file for complete search history.

(56) References Cited

U.S. PATENT DOCUMENTS

| 6,046,629 | A | * | 4/2000 | Akiyama | ............. | H04L 27/389 |
| | | | | | | 329/304 |
| 7,006,578 | B2 | | 2/2006 | Walker et al. | | |
| 7,675,998 | B2 | | 3/2010 | Bock et al. | | |
| 8,270,525 | B2 | * | 9/2012 | Nakagawa | ......... | H03M 13/256 |
| | | | | | | 375/261 |
| 8,693,888 | B2 | | 4/2014 | Pfau | | |
| 2012/0063549 | A1 | * | 3/2012 | Futami | ............. | H04L 25/03006 |
| | | | | | | 375/320 |

FOREIGN PATENT DOCUMENTS

| EP | 2112773 B1 | 6/2011 |
| EP | 2487813 B1 | 4/2013 |

* cited by examiner

*Primary Examiner* — Freshteh N Aghdam
(74) *Attorney, Agent, or Firm* — Paradice and Li LLP

(57) ABSTRACT

A method and apparatus for reducing distortion of satellite signals modulated using amplitude phase shift keying (APSK) are disclosed. A receiver such as a user terminal receives, from a satellite, a signal including APSK-modulated symbols mapped to a constellation including a plurality of points arranged in an inner circle and in an outer circle; determines, based on the received APSK-modulated symbols, a ratio between a radius of the inner circle of the constellation and a radius of the outer circle of the constellation; generates a correction signal based, at least in part, on a comparison between the determined ratio and a reference ratio; compensates for distortion of the received signal based, at least in part, on the correction signal; mixes the correction signal with the received signal to generate a distortion-compensated signal; and de-modulates the distortion-compensated signal to recover data transmitted from the satellite.

30 Claims, 16 Drawing Sheets

POST DISTORTION IN SATELLITE COMMUNICATIONS

INTRODUCTION

Various aspects described herein relate to satellite communications, and more particularly to reducing distortion associated with signals received from satellites.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits, such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from a LEO satellite may pass relatively quickly across the user terminals. The relative motion between the user terminals and the LEO satellite makes it very difficult for the user terminals to provide feedback to the LEO satellite regarding channel conditions and signal distortion. In addition, LEO satellites are typically "bent-pipe" satellites that have very limited signal processing resources. As a result, pre-distortion techniques to compensate for nonlinear distortion caused by power amplifiers within the LEO satellite may be impractical. This nonlinear distortion may make it difficult for the user terminals to correctly demodulate data from signals received from LEO satellites.

Thus, there is a need for the user terminals to compensate for distortion of signals received from LEO satellites.

SUMMARY

Aspects of the disclosure are directed to apparatus and methods for reducing amplitude and/or phase distortion of signals received from a satellite such as a LEO satellite. In one example, a method for reducing distortion of satellite signals modulated using amplitude phase shift keying (APSK) is disclosed. The method may include receiving, from a satellite, a signal including APSK-modulated symbols mapped to a constellation including a plurality of points arranged in an inner circle and in an outer circle; determining, based on the received APSK-modulated symbols, a ratio between a radius of the inner circle of the constellation and a radius of the outer circle of the constellation; generating a correction signal based, at least in part, on a comparison between the determined ratio and a reference ratio; and compensating for distortion of the received signal based, at least in part, on the correction signal.

In another example, a user terminal for reducing distortion of satellite signals modulated using APSK is disclosed. The user terminal may include one or more processors and a memory configured to store instructions. Execution of the instructions by the one or more processors may cause the user terminal to receive, from a satellite, a signal including APSK-modulated symbols mapped to a constellation including a plurality of points arranged in an inner circle and in an outer circle; determine, based on the received APSK-modulated symbols, a ratio between a radius of the inner circle of the constellation and a radius of the outer circle of the constellation; generate a correction signal based, at least in part, on a comparison between the determined ratio and a reference ratio; and compensate for distortion of the received signal based, at least in part, on the correction signal.

In another example, a user terminal for reducing distortion of satellite signals modulated using APSK is disclosed. The user terminal may include means for determining, based on the received APSK-modulated symbols, a ratio between a radius of the inner circle of the constellation and a radius of the outer circle of the constellation; means for generating a correction signal based, at least in part, on a comparison between the determined ratio and a reference ratio; and means for compensating for distortion of the received signal based, at least in part, on the correction signal.

In another example, a non-transitory computer-readable medium is disclosed. The non-transitory computer-readable medium may store instructions that, when executed by one or more processors of a user terminal, cause the user terminal to reduce distortion of satellite signals modulated using APSK. Execution of the instructions by the one or more processors may cause the user terminal to perform operations including receiving, from a satellite, a signal including APSK-modulated symbols mapped to a constellation including a plurality of points arranged in an inner circle and in an outer circle; determining, based on the received APSK-modulated symbols, a ratio between a radius of the inner circle of the constellation and a radius of the outer circle of the constellation; generating a correction signal based, at least in part, on a comparison between the determined ratio and a reference ratio; and compensating for distortion of the received signal based, at least in part, on the correction signal.

BRIEF DESCRIPTION OF THE DRAWINGS

Aspects of this disclosure are illustrated by way of example and are not intended to be limited by the figures of the accompanying drawings, where.

Like reference numerals refer to corresponding parts throughout the drawing figures.

DETAILED DESCRIPTION

Figure 1:
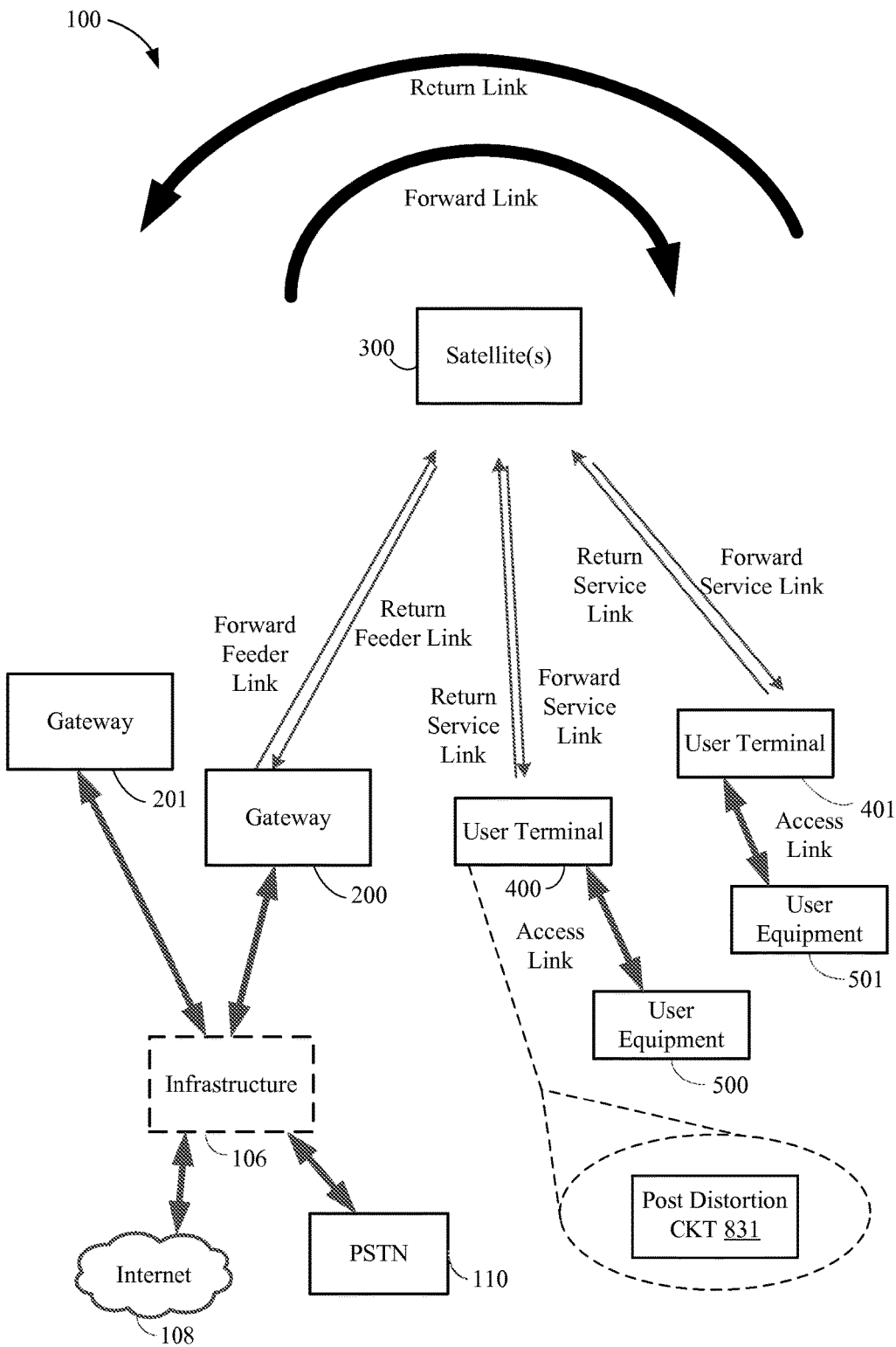
FIG. 1 shows a block diagram of an example communication system.

The example implementations described herein may allow a receiving device such as a user terminal to compensate for amplitude and/or phase distortion of received satellite signals caused, for example, by non-linear characteristics of one or more power amplifiers provided within the satellite. As described in more detail below, the receiving device may include a post-distortion circuit and/or one or more processors configured to determine an amount of amplitude and/or phase distortion in the received satellite signals, to generate a correction signal based on the determined amount of amplitude and/or phase distortion, and then mix the received satellite signals with the correction signal to compensate for the amplitude and/or phase distortion of the received satellite signals.

For example implementations, the satellite may include a number of power amplifiers that distort signals modulated using amplitude phase shift keying (APSK). A receiver, such as a user terminal, may receive a satellite signal including APSK-modulated symbols mapped to a constellation including a plurality of points arranged in an inner circle and in an outer circle. The receiver may determine, based on the received APSK-modulated symbols, a ratio between a radius of the inner circle of the constellation and a radius of the outer circle of the constellation, and then generate a correction signal based, at least in part, on a comparison between the determined ratio and a reference ratio. The receiver may then compensate for amplitude distortion of the received signal based, at least in part, on the correction signal. For some aspects, the correction signal may indicate an operating point of one or more power amplifiers within the satellite. Then, the receiver may mix the correction signal with the received signal to generate a distortion-compensated signal, and thereafter de-modulate the distortion-compensated signal to recover data transmitted from the satellite.

The reference ratio may be a ratio of a reference (or expected) radius of the inner circle and a reference (or expected) radius of the outer circle. The reference ratio, which may be known to the receiver, may indicate an expected ratio of the radius of the inner circle and the radius of the outer circle. For some aspects, the reference ratio may be determined using pilot signals transmitted from the satellite.

For some implementations, the receiver may also compensate for phase distortion of the received signal, for example, by generating the correction signal based, at least in part, on an amount of phase rotation of the constellation. More specifically, the receiver may determine phase information of the received APSK-modulated symbols, and then compare the determined phase information with reference phase information. Generation of the correction signal may then be based, at least in part, on the comparison between the determined phase information and the reference phase information.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The UT 400 may include a post-distortion circuit 831 that compensates for amplitude and/or phase distortion of signals received from satellite 300. For example, non-linear characteristics of power amplifiers provided within satellite 300 may cause amplitude and/or phase distortion of signals that are amplified by the power amplifiers and then subsequently transmitted to UT 400. The resulting amplitude and/or phase distortion of the received signals may degrade the ability of UT 400 to decode data modulated onto the received signals. As explained in more detail below with respect to FIGS. 8A-8B and 9, the post-distortion circuit 831 may be used to "linearize" the received signals so that UT 400 is able to properly decode the modulated data. Although not shown in FIG. 1 for simplicity, UT 401 may also include post-distortion circuit 831.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
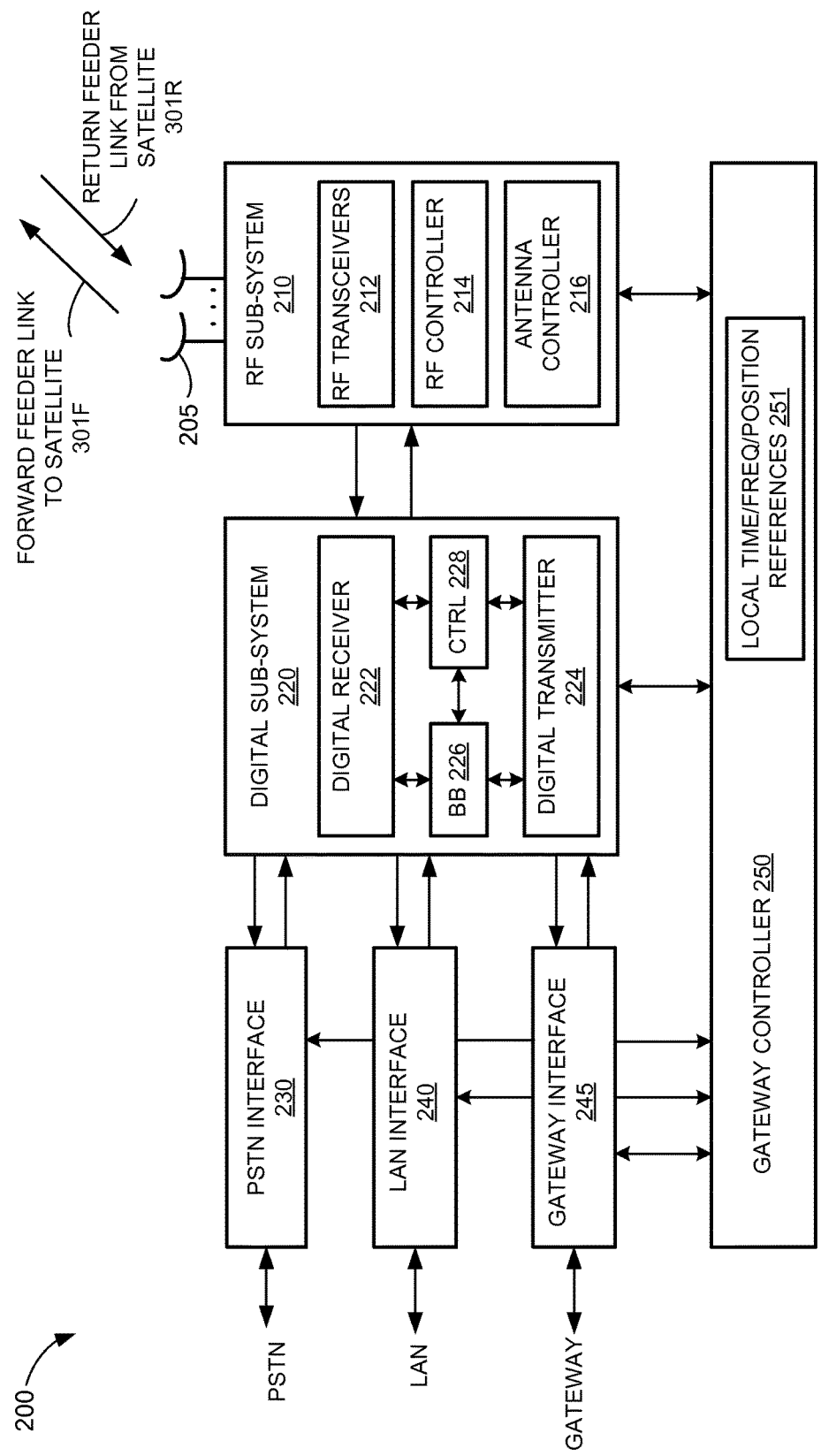
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband processor 226, and a control processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
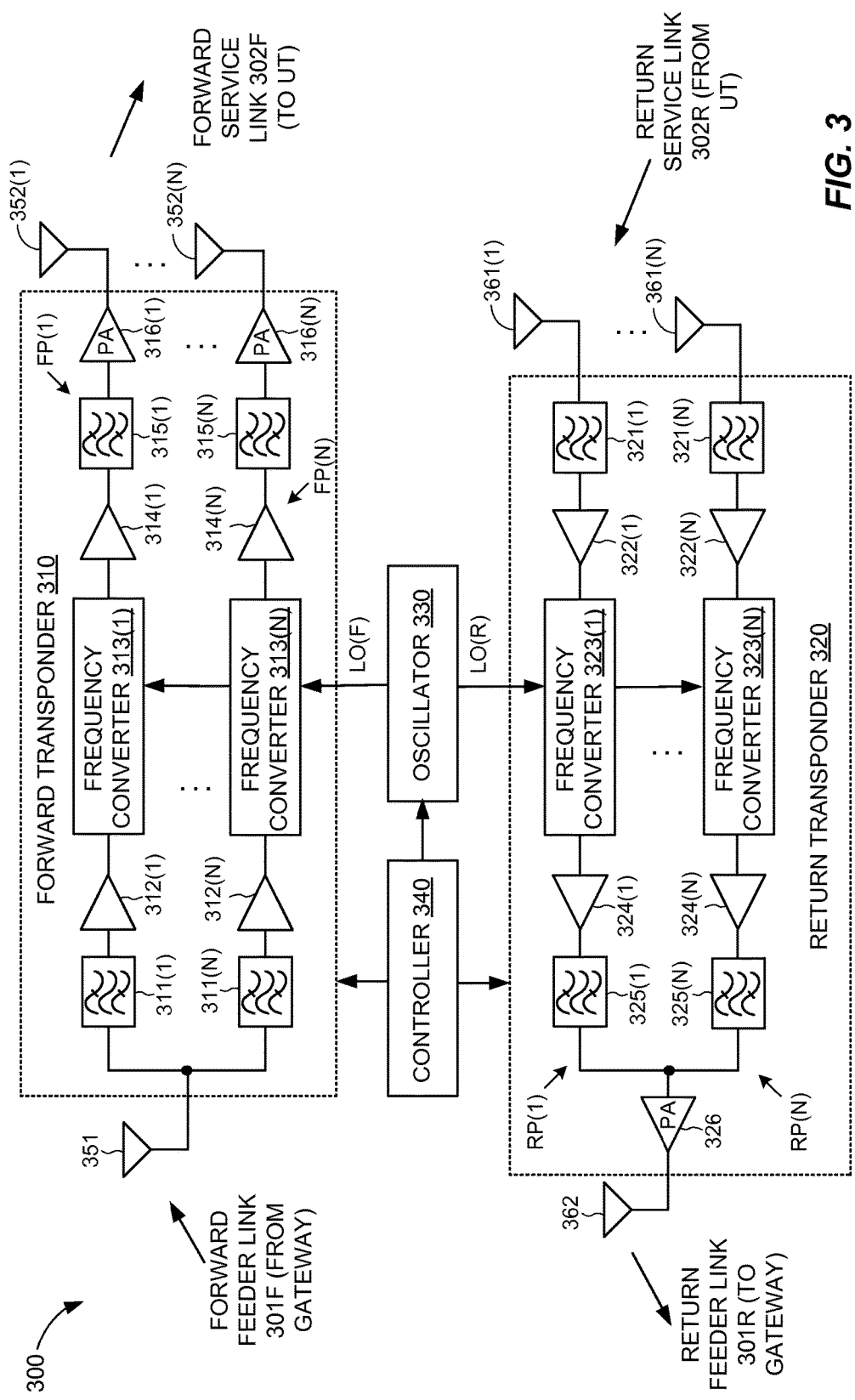
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 10 and 11.

Figure 4:
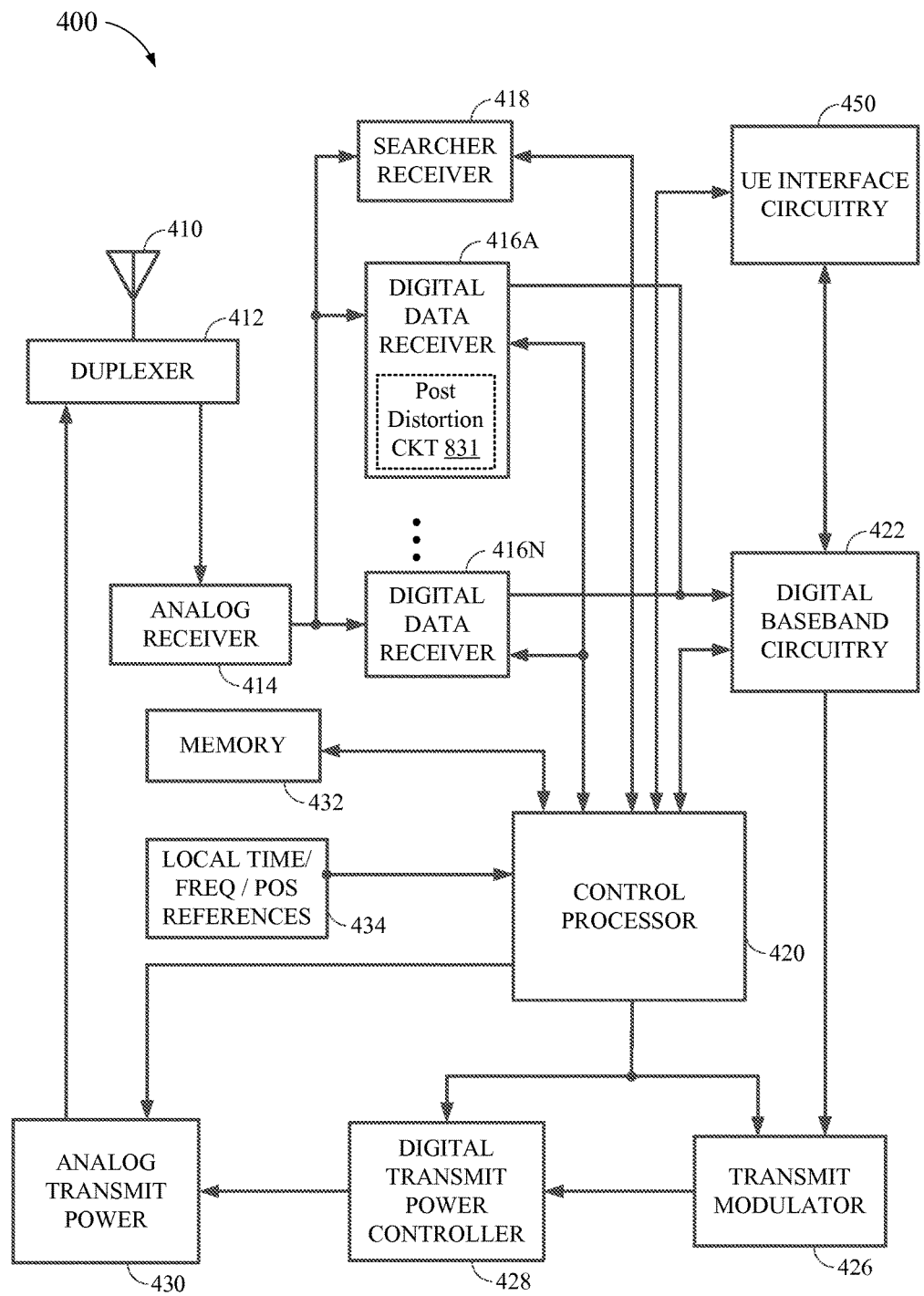
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

In addition, one or more of the digital data receivers 416A-N may include a post-distortion circuit 831 that compensates for amplitude and/or phase distortion of signals received from satellite 300. For example, non-linear characteristics of power amplifiers provided within satellite 300 may cause amplitude and/or phase distortion of signals that are amplified by the power amplifiers and then subsequently transmitted to UT 400. The resulting amplitude and/or phase distortion of the received signals may degrade the ability of UT 400 to decode data modulated onto the received signals. As explained in more detail below with respect to FIGS. 8A-8B and 9, the post-distortion circuit 831 may be used to "linearize" the received signals so that UT 400 is able to properly decode the modulated data. Although not shown in FIG. 4 for simplicity, other ones of digital data receivers 416A-N may also include post-distortion circuit 831.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
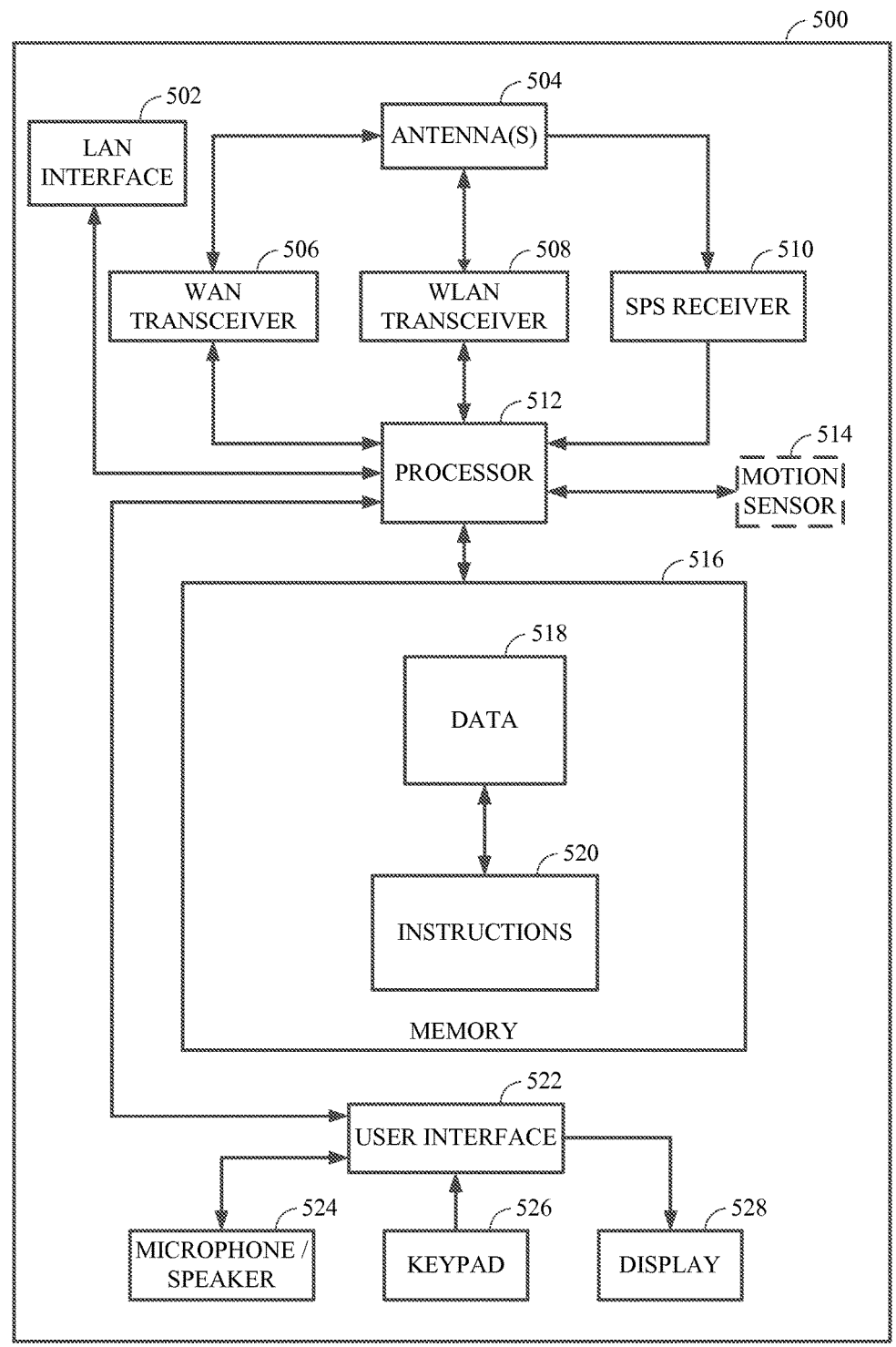
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

Transmitting high power signals from satellites such as satellite 300 can be challenging due to the inherent non-linear characteristics of power amplifiers (PAs) provided within the transponders of the satellites. More specifically, power amplifiers typically have a limited linear region of operation for which their operating characteristics are predictable. For example, if the operating temperature and/or power level of a power amplifier falls outside a specified range, the power amplifier may begin operating in a non-linear manner that undesirably distorts the data signals being amplified for subsequent transmission to a receiving device (e.g., UT 400). The resultant signal distortion can lead to data errors in the receiving device.

As mentioned above, because satellite 300 is a "bent-pipe" satellite that has limited processing capabilities, pre-distortion techniques are not a feasible solution to compensate for the inherent non-linear characteristics of power amplifiers provided within satellite 300. Thus, in accordance with example implementations, the UTs 400 may use post-distortion techniques to compensate for distortion associated with signals transmitted from satellite 300.

Referring again to FIGS. 3 and 4, each forward path (FP) of satellite 300 includes an associated power amplifier (PA) 316 to amplify signals to be transmitted to the UT 400 via forward service link 302F. The PAs 316(1)-316(N), which may account for a significant portion of the total power consumed by satellite 300, exhibit non-linear characteristics that may cause distortion of the amplified signals to be transmitted to the UTs 400. To increase the efficiency of the PAs 316(1)-316(N), each of the PAs 316(1)-316(N) may be driven into saturation (e.g., operated in the saturation region). Although operating the PAs 316(1)-316(N) in the saturation region increases amplifier efficiency, it may also result in signal distortion which, in turn, may result in decoding errors in the UTs 400.

Quadrature amplitude modulation (QAM) is a type of modulation scheme that can be used to transmit data by modulating a carrier signal. QAM "symbols" are mapped to binary data bits based on the amplitude and phase of the QAM signal received during a particular symbol period. The mapping and de-mapping of QAM symbols is typically performed using a "constellation," wherein each point on the constellation represents both a QAM symbol (e.g., corresponding to a set of amplitude and phase information) and a binary bit pattern (e.g., corresponding to a set of labeling bits). Thus, a constellation may be used to map binary data bits to QAM symbols to be transmitted, as well as to recover (e.g., de-map) binary data from received QAM symbols. For example, an M-QAM constellation may be used to map M number of symbols to M number of bit patterns, wherein each bit pattern includes $L=\log_2(M)$ number of labeling bits.

The data rate of a QAM communications system varies directly with the QAM constellation size. For example, increasing the number of constellation points (M) also increases the number of data bits (L) that can be communicated during a symbol period (e.g., $L=\log_2(M)$). As the constellation becomes more densely populated, the spacing between constellation points (e.g., the "Euclidean distance") becomes smaller. This reduces the margin of error that the system can tolerate when using the constellation to recover data bits from a received QAM signal. Further, because imperfections exist in the transmission channel and in the receiving circuits, the received signal may be distorted. This may cause bit errors in the received signal.

Higher levels of QAM, such as 16-QAM, 64-QAM, and 128-QAM, employ many different amplitude and phase shift levels to modulate symbols onto the carrier signal, and are therefore more susceptible to noise and distortion than lower levels of QAM (e.g., such as 4-QAM). For example, a 16-QAM scheme uses three different amplitude levels and 12 different phase shifts to transmit 4 data bits per symbol. As a result, 16-QAM (and higher QAM levels) typically require linear power amplifiers to minimize distortion. However, linear power amplifiers are typically less efficient than non-linear power amplifiers, and therefore may not be suitable for use in LEO satellites such as satellites 300.

Thus, for example implementations, satellite 300 may use a 16-APSK (Amplitude Phase Shift Keying) modulation scheme to modulate data onto carrier signals for transmission to the UT 400. The 16-APSK modulation scheme, which is used by the DVB-S2X standard, has low peak-to-average ratio (PAR) characteristics, and is therefore well-suited for modulating data onto signals to be amplified using non-linear power amplifiers (e.g., such as PA 316(1)-316(N) of FIG. 3). The 16-APSK modulation scheme uses a circular constellation in which points on the constellation, which as described above, may be used to map symbols to binary data patterns, are arranged in circles (e.g., rather than the square-shaped constellations used for 16-QAM, 64-QAM, 128-QAM, and 256-QAM schemes).

Figure 6A:
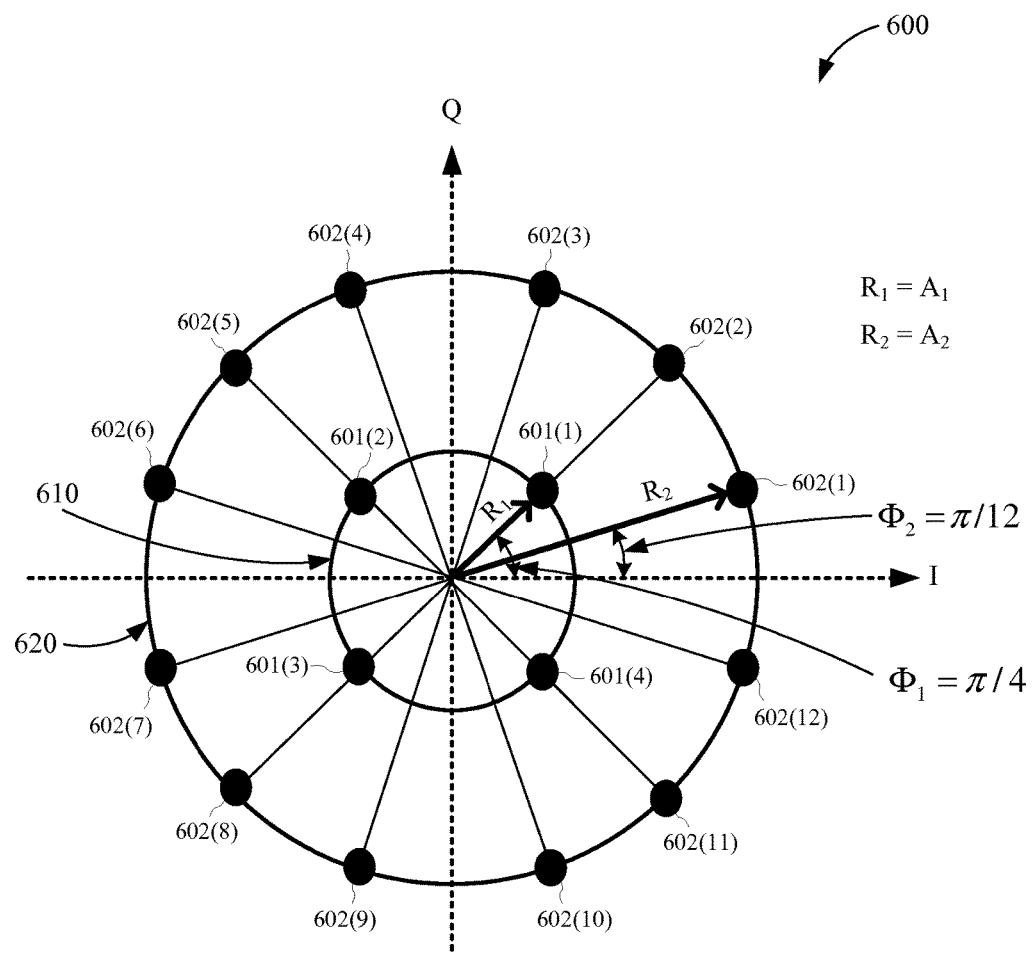
FIG. 6A depicts an example reference constellation for a 16-APSK modulation scheme.

For example, FIG. 6A depicts an example reference constellation 600 for a 16-APSK modulation scheme. As shown in FIG. 6A, the reference constellation 600 is circular, and includes a plurality of points 601 and 602 arranged in an inner circle 610 and in an outer circle 620, respectively. Each of the points 601 and 602 of reference constellation 600 may be defined by an amplitude value (A) and a phase value (D) of an APSK-modulated signal (which may be referred to herein as the "APSK signal"). More specifically, a first group of four (4) points 601 are arranged on the inner circle 610, and a second group of twelve (12) points 602 are arranged on the outer circle 620. The inner circle 610 has a first radius $R_1$, and the outer circle 620 has a second radius $R_2$. The ratio of the first radius $R_1$ and the second radius $R_2$, which may be denoted herein as a reference ratio $\gamma_{REF}=R_1/R_2$, is ideally a constant value. The first radius $R_1$ corresponds to a first amplitude value ($A_1$) of the APSK signal, and the second radius $R_2$ corresponds to a second amplitude value ($A_2$) of the APSK signal.

Thus, all points 601(1)-601(4) on the inner circle 610 may be defined by the first amplitude value $A_1$ and a phase value $\Phi=\pi/(N*4)$, where N is an integer value between 1 and 4 (inclusive). All points 602(1)-602(12) on the outer circle 620 may be defined by the second amplitude value $A_2$ and a phase value $\Phi=\pi/(M*12)$, where M is an integer value between 1 and 12 (inclusive). Thus, symbols mapped to points 601(1)-601(4) on the inner circle 610 have the same amplitude $A_1$ and are separated in phase by $\Phi_1=\pi/4$ radians, and symbols mapped to points 602(1)-602(12) on the outer circle 620 have the same amplitude $A_2$ and are separated in phase by $\Phi_2=\pi/12$ radians. For example, point 601(1) on the inner circle 610 is mapped to a symbol represented by the APSK signal having an amplitude equal to $A_1$ and a phase equal to $\Phi=\pi/4$, and point 602(1) on the outer circle 620 is mapped to a symbol represented by the APSK signal having an amplitude equal to $A_2$ and a phase equal to $\Phi=\pi/12$.

Because the reference constellation 600 may represent 16 different 4-bit binary data patterns using only two (2) different amplitude values ($A_1$ and $A_2$) and twelve (12) different phase values, APSK signals are well-suited for amplification by PAs 316(1)-316(N) when configured to operate in the saturation region. Referring again to FIG. 3, when a respective one of the PAs 316 operates in the saturation region to amplify an APSK signal, the inherent non-linear characteristics of the respective PA 316 may cause distortion of the APSK signal. This distortion may alter the relative amplitudes $A_1$ and $A_2$ associated with the first points 601 and the second points 602, respectively, which in turn may alter the first and second radii $R_1$ and $R_2$ associated with the inner and outer circles 610 and 620, respectively, of the reference constellation 600.

More specifically, non-linear distortion introduced into the APSK signals by PAs 316(1)-316(N) may cause the amplified APSK signals to have an amplitude value of $A_1'$ for symbols mapped to points 601 on the inner circle 610 of the reference constellation 600 and to have an amplitude value of $A_2'$ for symbols mapped to points 602 on the outer circle 620 of the reference constellation 600 (e.g., rather than the expected amplitude values $A_1$ and $A_2$, respectively). As a result, using reference constellation 600 of FIG. 6A to de-map symbols encoded within distorted APSK signals may result in decoding errors, for example, because the points 601 on the inner circle 610 of reference constellation 600 may no longer correspond to the first amplitude value $A_1$, and the points 602 on the outer circle 620 of reference constellation 600 may no longer correspond to the second amplitude value $A_2$.

Figure 6B:
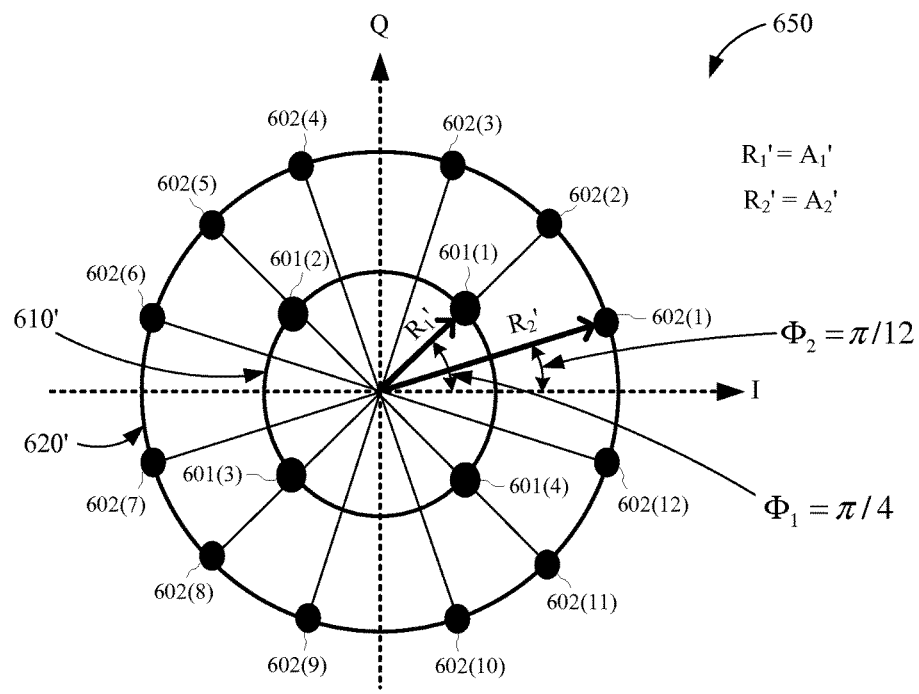
FIG. 6B depicts one example distorted constellation for the 16-APSK modulation scheme.

For example, FIG. 6B depicts a constellation 650 that is an amplitude distorted version of the reference constellation 600 of FIG. 6A. The distorted constellation 650 may correspond to the distorted APSK signals such that, for example, a receiver may need to use the distorted constellation 650, rather than the reference constellation 600, to properly recover data from the distorted APSK signals. More specifically, the radius of the inner circle 610' of distorted constellation 650 has a value $R_1'$ that is less than the reference radius $R_1$, and the radius of the outer circle 620' of distorted constellation 650 has a value $R_2'$ that is less than the reference radius $R_2$. The first "distorted" radius $R_1'$ corresponds to the first amplitude value $A_1'$ of the distorted APSK signal, and the second "distorted" radius $R_2'$ corresponds to the second amplitude value $A_2'$ of the distorted APSK signal. The ratio of the first distorted radius $R_1'$ and the second distorted radius $R_2'$, which may be denoted herein as a distorted ratio $\gamma_{DST}=R_1'/R_2'$, may be used for post-distortion compensation of APSK signals transmitted from satellite 300 to UT 400, as described in more detail below.

Referring again to FIG. 6A, because the amplitude $A_1$ of signals modulated to include symbols mapped to points 601 on the inner circle 610 is different (e.g., less) than the amplitude $A_2$ of signals modulated to include symbols mapped to points 602 on the outer circle 620, the amount of amplifier distortion introduced into signals containing symbols mapped to the inner circle 610 may be different (e.g., less) than the amount of amplifier distortion introduced into signals containing symbols mapped to the outer circle 620. As a result, the difference between values of $R_1$ and $R_1'$ may be less than the difference between values of $R_2$ and $R_2'$ (e.g., $|R_1-R_1'|<|R_2-R_2'|$), for example, so that the reference ratio $\gamma_{REF}$ and the distorted ratio $\gamma_{DST}$ are of different values (e.g., $\gamma_{REF}\neq\gamma_{DST}$). In this manner, a receiver within the UT 400 of FIG. 4 may compare the reference ratio $\gamma_{REF}$ with the distorted ratio $\gamma_{DST}$ to generate a to correction signal indicative of the amount of amplitude distortion introduced into the APSK signals by the PAs 316(1)-316(N).

Figure 6C:
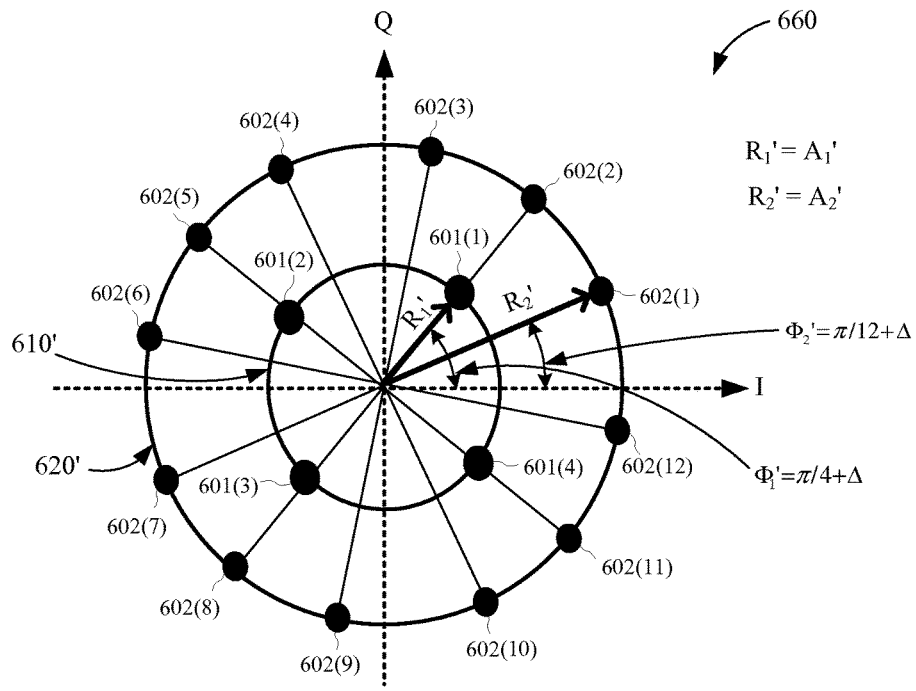
FIG. 6C depicts another example distorted constellation for the 16-APSK modulation scheme.

The non-linear characteristics of the PAs 316(1)-316(N) in satellite 300 may also distort the APSK signals in a manner that causes the points 601 and 602 to rotate about the I-axis and the Q-axis. For example, FIG. 6C depicts a constellation 660 that is an amplitude and phase distorted version of the reference constellation 600 of FIG. 6A. The distorted constellation 660 is similar to the distorted constellation 650 of FIG. 6B, except that the points 601 and 602 are rotated (counter clockwise) about the I-axis and the Q-axis (e.g., as compared to the reference constellation 600 of FIG. 6A and the distorted constellation 650 of FIG. 6B). More specifically, non-linear amplifier distortion of the APSK signals has increased the phase values of the points 601 and 602 by an angular value denoted herein as $\Delta$. For example, symbols mapped to points 601(1)-601(4) on the inner circle 610' of distorted constellation 660 are still separated in phase by $\Phi_1=\pi/4$ radians, and symbols mapped to points 602(1)-602(12) on the outer circle 620' of distorted constellation 660 are still separated in phase by $\Phi_2=\pi/12$ radians. However, the phases of all points 601 and 602 of distorted constellation 660 have been increased by the angular value $\Delta$. For example, point 601(1) of distorted constellation 660 has a distorted phase value equal to $\Phi_1'=\pi/4+\Delta$, and outer point 602(1) of distorted constellation 660 has a distorted phase value equal to $\Phi_2'=\pi/12+\Delta$. In this manner, a receiver within the UT 400 of FIG. 4 may compare phase information of points 601-602 of the reference constellation 600 with phase information of points 601-602 of the distorted constellation 660 to generate a correction signal indicative of the amount of phase distortion introduced into the APSK signals by the PAs 316(1)-316(N).

The generated correction signal, which may also be indicative of the operating point of a respective one of the PAs 316(1)-316(N), may be mixed (or otherwise combined) with the APSK signals received from satellite 300 to generate distortion-compensated APSK signals. The UT's receiver may then de-modulate the resulting distortion-compensated APSK signals to recover symbols transmitted from the satellite 300 with fewer decoding errors than would be possible without such post distortion techniques. Thus, as explained in more detail below, the ability of the UT's receivers to effectively "linearize" operation of the PAs 316(1)-316(N) of satellite 300 using the generated correction signal may improve the quality of satellite communications associated with satellite system 100 of FIG. 1.

Further, for at least some implementations, the operating points of PAs 316(1)-316(N) may be set (or dynamically adjusted) such that (1) signals modulated with symbols mapped to the inner circle 610 of the reference constellation 600 are amplified in the linear region of PAs 316(1)-316(N), and (2) signals modulated with symbols mapped to the outer circle 620 of the reference constellation 600 are amplified in the saturation region of PAs 316(1)-316(N). By "pre-conditioning" the operating points of the PAs 316(1)-316(N) in this manner, the example implementations may ensure that distortion introduced by the PAs 316(1)-316(N) decreases the radius $R_1$ of the inner circle 610 of the reference constellation 600 by a lesser amount than the radius $R_2$ of the outer circle 620 of the reference constellation 600, for example, so that the values of $\gamma_{REF}$ and $\gamma_{DST}$ are not the same.

Figure 7A:
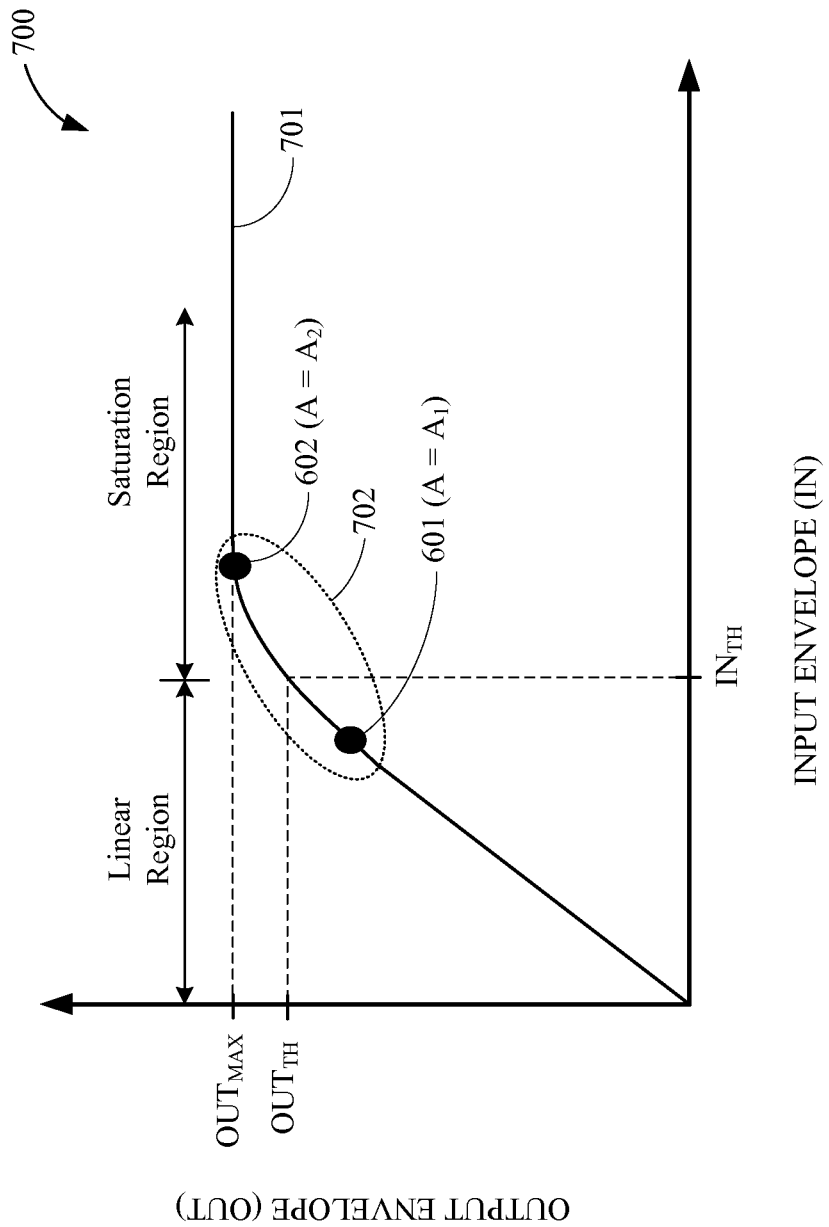
FIG. 7A depicts a first example operating point of a respective power amplifier of FIG. 3, in accordance with example implementations.

For example, FIG. 7A is a graph 700 depicting an exemplary relationship between constellation points and power amplifier operating regions, in accordance with example implementations. Graph 700 is shown to include a curve 701 representing an output envelope (OUT) as a function of an input envelope (IN) for a respective one of PAs 316(1)-316(N). The input envelope (IN) may represent any suitable input characteristics of signals to be amplified by the respective PA 316, and the output envelope (OUT) may represent any suitable output characteristics of signals after amplification by the respective PA 316. In some aspects, the input envelope (IN) may represent an input power level of signals provided to the respective PA 316, and the output envelope (OUT) may represent an output power level of signals amplified by the respective PA 316. In other aspects, the input envelope (IN) may represent an amplitude (e.g., input voltage) level of signals prior to amplification by the respective PA 316, and the output envelope (OUT) may represent an amplitude (e.g., output voltage) level of signals after amplification by the respective PA 316.

As depicted by curve 701, when the respective PA 316 operates in the linear region, the output envelope (OUT) is directly proportional to the input envelope (IN), and when the respective PA 316 operates in the saturation region, the output envelope (OUT) is no longer directly proportional to the input envelope (IN). More specifically, as long as the respective PA 316 operates in the linear region, the signal's output voltage may increase in response to increases in the signal's input voltage; however, when the respective PA 316 operates in the saturation region, the signal's output voltage does not increase beyond a maximum value ($OUT_{MAX}$), irrespective of further increases in the signal's input voltage (e.g., because the respective PA 316 is saturated). For illustrative purposes, the boundary between the liner region and the saturation region is depicted in FIG. 7A as corresponding to an input envelope threshold value ($IN_{TH}$) and to an output envelope threshold value ($OUT_{TH}$).

As depicted in FIG. 7A, for at least some implementations, an operating region 702 of the respective PA 316 may be set so that the first amplitude value $A_1$ of the APSK signals falls within the linear region of operation (e.g., $A_1<IN_{TH}$), and the second amplitude value $A_2$ of the APSK signals falls within the saturation region of operation (e.g., $A_2>IN_{TH}$). As a result, symbols mapped to points 601 on the inner circle 610 of the reference constellation 600 may be amplified by the respective PA 316 in a linear manner, and symbols mapped to points 602 on the outer circle 620 of the reference constellation 600 may be amplified by the respective PA 316 in a non-linear manner. Thus, setting an operating point of the respective PA 316 to be within the operating region 702 may not only optimize (e.g., maximize) the efficiency of the respective PA 316, but may also ensure that symbols mapped to points 601 on the inner circle 610 of the reference constellation 600 experience less distortion than symbols mapped to points 602 on the outer circle 620 of the reference constellation 600. This may be important because, as discussed above, it is desirable for the distorted ratio of radii values ($\gamma_{DST}$) to be different from the reference ratio of radii values ($\gamma_{REF}$). Thus, for at least some implementations, the operating point of the PAs 316(1)-316(N) may be selected (or dynamically adjusted) to fall within the operating region 702 of FIG. 7A.

Figure 7B:
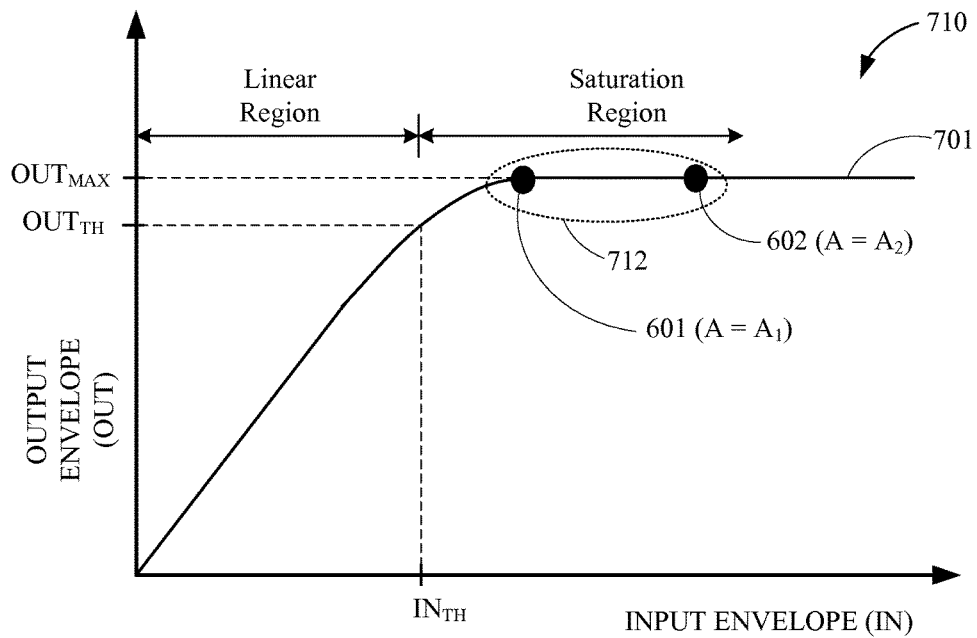
FIG. 7B depicts a second example operating point of the respective power amplifier of FIG. 3, in accordance with example implementations.

Setting the operating point of the PAs 316(1)-316(N) to other regions of curve 701 may degrade performance. For example, if the PAs 316(1)-316(N) are driven too hard (e.g., such that the APSK signals are amplified in a non-linear manner for both the first and second amplitude values $A_1$ and $A_2$), then the decrease in the radius $R_1$ of the inner circle 610 of the reference constellation 600 caused by amplifier distortion may be the same as the decrease in the radius $R_2$ of the outer circle 620 of the reference constellation 600. FIG. 7B is a graph 710 depicting a respective PA 316 having an operating point within an operation region 712 that lies entirely within the saturation region. When operating in operating region 712 of FIG. 7B, the respective PA 316 amplifies APSK signals in a non-linear manner for both amplitude values $A_1$ and $A_2$, thereby resulting in significant distortion of symbols mapped to points 601 on the inner circle 610 of the reference constellation 600 and to points 602 on the outer circle 620 of the reference constellation 600. As a result, the points 601 on the inner circle 610 and the points 602 on the outer circle 620 may overlap one another, which may render de-mapping the received symbols very difficult (if not impossible). In addition, the resulting values of $\gamma_{REF}$ and $\gamma_{DST}$ may be the same, which may preclude any usefulness of the generated correction signal.

Figure 7C:
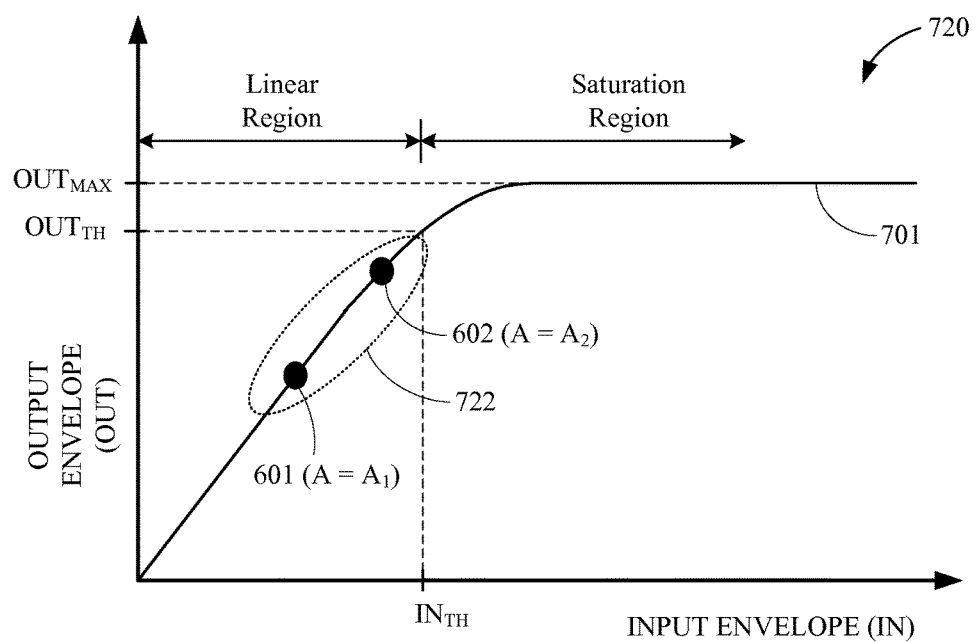
FIG. 7C depicts a third example operating point of the respective power amplifier of FIG. 3, in accordance with example implementations.

Conversely, if the PAs 316(1)-316(N) are not driven hard enough (e.g., such that the PAs 316(1)-316(N) always operate in the linear region, irrespective of the input signal amplitude), then the efficiency of the PAs 316(1)-316(N) may be too low to effectively transmit the APSK signals to the UTs 400. FIG. 7C is a graph 720 depicting a respective PA 316 having an operating point within an operation region 722 that lies entirely within the linear region. When operating in operating region 722 of FIG. 7C, the efficiency of the respective PA 316 may fall below an acceptable level or threshold value associated with transmission of APSK signals from satellite 300 to UT 400. Thus, it may be desirable to determine an optimum operating point for each of the PAs 316(1)-316(N) so that the change in $R_1$ caused by amplitude distortion is not the same as the change in $R_2$ caused by amplitude distortion.

Figure 8A:
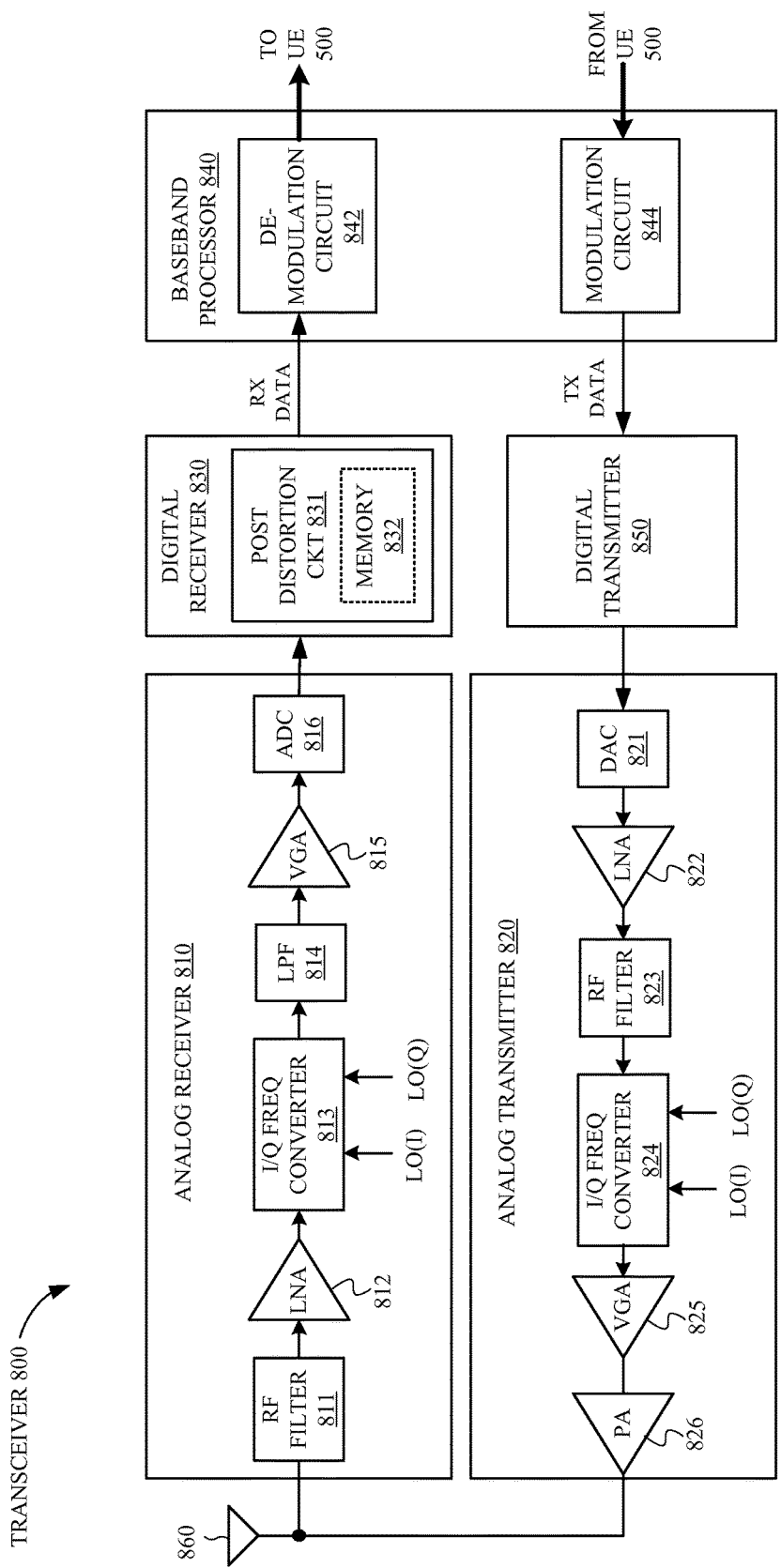
FIG. 8A depicts one example transceiver that may be used within the user terminal of FIG. 4, in accordance with example implementations.

FIG. 8A is a block diagram of a transceiver 800 that may be used within a user terminal such as UT 400 of FIG. 4. As shown in FIG. 8A, transceiver 800 includes an analog receiver 810, an analog transmitter 820, a digital receiver 830, a baseband processor 840, a digital transmitter 850, and an antenna 860. Together, the analog receiver 810 and the analog transmitter 820 may form a transceiver chain of transceiver 800. Although only one transceiver chain is shown in FIG. 8A, for actual implementations, transceiver 800 may include any suitable number of transceiver chains. Similarly, although only one antenna 860 is shown in FIG. 8A, for actual implementations, transceiver 800 may be coupled to any suitable number of antennas.

For some aspects, the analog receiver 810 may correspond to analog receiver 414 of FIG. 4, and the analog transmitter 820 may correspond to transmit power amplifier 430 of FIG. 4. For the example of FIG. 8A, the analog receiver 810 is shown to include a radio-frequency (RF) filter 811, a low-noise amplifier (LNA) 812, an in-phase (I) and quadrature (Q) frequency converter 813, a low pass filter (LPF) 814, a variable gain amplifier (VGA) 815, and an analog-to-digital converter (ADC) 816. Satellite signals (e.g., APSK signals) may be received from satellite 300 via antenna 860, filtered by the RF filter 811, and then amplified by the LNA 812. The received signals may then be down-converted (e.g., from the carrier frequency to a baseband frequency) by I/Q frequency converter 813. For example, although not shown in FIG. 8A for simplicity, the I/Q frequency converter 813 may include a first mixer to down-convert the in-phase signal components using an in-phase local oscillator signal LO(I), and may include a second mixer to down-convert the quadrature signal components using a quadrature local oscillator signal LO(Q). The local oscillator signals LO(I) and LO(Q) may be generated by any suitable oscillator circuit (not shown for simplicity). The down-converted signals may be filtered by LPF 814, amplified by the VGA 815, and then converted to digital signals by the ADC 816. The digital signals may be provided from analog receiver 810 to the digital receiver 830.

For some aspects, the digital receiver 830 may correspond to digital data receivers 416 of FIG. 4. For the example of FIG. 8A, the digital receiver 830 is shown to include a post-distortion circuit 831 that receives the digital signals from analog receiver 810. The post-distortion circuit 831 may compensate for amplitude distortion of the digital signals based, at least in part, on a comparison between the reference ratio $\gamma_{REF}$ and the distorted ratio $\gamma_{DST}$. More specifically, the post-distortion circuit 831 may determine a first amplitude value ($A_1'$) of the digital signals when modulated with symbols mapped to points 601 on the inner circle 610 of the constellation, and may determine a second amplitude value ($A_2'$) of the digital signals when modulated with symbols mapped to points 602 on the outer circle 620 of the constellation. Because the amplitude values $A_1'$ and $A_2'$ correspond to the inner radius $R_1'$ and the outer radius $R_2'$ of the distorted constellation 650, the distorted ratio $\gamma_{DST}$ may be determined by dividing the determined value of $A_1'$ by the determined value of $A_2'$ (e.g., $\gamma_{DST} \approx A_1'/A_2'$). The post-distortion circuit 831 may then compare the value of the distorted ratio $\gamma_{DST}$ with the value of the reference ratio $\gamma_{REF}$ to generate an amplitude component of the correction signal. Thus, the amplitude component of the correction signal may indicate an amount by which the amplitude values $A_1'$ and $A_2'$ of the received APSK signals differ from the expected (e.g., the reference) amplitude values $A_1$ and $A_2$, respectively, of APSK signals.

The post-distortion circuit 831 may compensate for phase distortion of the digital signals based, at least in part, on a comparison between the reference phase information and the distorted phase information, for example, where the reference phase information indicates the phase values of points 601-602 of the reference constellation 600, and the distorted phase information indicates the phase values of points 601-602 of the distorted constellation 660.

The post-distortion circuit 831 may use the correction signal to reduce distortion in the digital signals, for example, by attempting to linearize the digital signals. The post-distortion circuit 831 may use a digital signal processor (DSP) to linearize the digital signals. For at least some implementations, the post-distortion circuit 831 may mix (or otherwise combine) the correction signal with the digital signal to generate a distortion-compensated data signal from which data may be recovered using the reference constellation 600 of FIG. 6A. More specifically, the distortion-compensated data signal may be linearized such that (1) the amplitude of the distortion-compensated data signal is equal to the first amplitude value $A_1$ for symbols mapped to points 601 on the inner circle 610 of the reference constellation 600, and (2) the amplitude of the distortion-compensated data signal is equal to the second amplitude value $A_2$ for symbols mapped to points 602 on the outer circle 620 of the reference constellation 600. In this manner, the post-distortion circuit 831 may expand the inner circle 610' of the distorted constellation 650 by a first amount (e.g., equal to $R_1 - R_1'$), and may expand the outer circle 620' of the distorted constellation 650 by a second amount (e.g., equal to $R_2 - R_2'$). The post-distortion circuit 831 may provide the distortion-compensated signal as receive data (RX DATA) to baseband processor 840.

The post-distortion circuit 831 may include a memory 832 to store reference information. The stored reference information may include or indicate the reference ratio $\gamma_{REF}$, the reference amplitude values $A_1$ and $A_2$, the reference radii values $R_1$ and $R_2$, and/or the reference phases of the points 601 and 602 of the constellation 600. For some aspects, the reference information may be predetermined and stored in memory 832 (e.g., prior to operation of UT 400). For example, because the 16-APSK modulation scheme to be used for satellite communications is defined in the DVB-S2 standards, the reference information may include predetermined amplitude values and predetermined phase values associated with the reference constellation 600 of FIG. 6A.

For other aspects, the reference information may be determined (or dynamically updated) using pilot signals received from satellite 300. More specifically, the satellite 300 may transmit one or more pilot signals containing a number of first symbols mapped to points 601 on the inner circle 610 of the reference constellation 600 and containing a number of second symbols mapped to points 602 on the outer circle 620 of the reference constellation 600. Because the first and second symbols transmitted on the one or more pilot signals are known to the UT 400, the post-distortion circuit 831 may determine amplitude values associated with the first and second symbols (e.g., $A_1$ and $A_2$, respectively), correlate these amplitude values to radius values for the points 601 on the inner circle 610 and the points 602 on the outer circle 620 of the reference constellation 600 (e.g., $R_1$ and $R_2$, respectively), and then calculate the reference ratio $\gamma_{REF}$. In a similar manner, the post-distortion circuit 831 may determine, from the pilot signals, phase values of symbols mapped to the reference constellation 600, and store the determined phase values as reference phases.

Although the post-distortion circuit 831 is depicted in FIG. 8A as being included within digital receiver 830, for other implementations, the post-distortion circuit 831 may be implemented within baseband processor 840 or as a separate circuit.

The baseband processor 840 may correspond to digital baseband circuitry 422 of FIG. 4. For example, if diversity signal processing is employed, then the baseband processor 840 may include a diversity combiner and decoder (not shown for simplicity). In general, the baseband processor 840 may be used to receive, store, and process data from received satellite signals for transmission to one or more UEs 500, and may be used to receive, store, and process data received from one or more UEs 500 for transmission to satellite 300.

For the example of FIG. 8A, the baseband processor 840 is shown to include a de-modulation circuit 842 and a modulation circuit 844. The de-modulation circuit 842 de-modulates the distortion-compensated signals (RX DATA) to recover the data transmitted from the satellite 300. More specifically, because the post-distortion circuit 831 may restore the received symbols' amplitude values to their expected values ($A_1$ and $A_2$) and may restore the received symbols' phase values to their expected values ($\Phi_1$ and $\Phi_2$), the de-modulation circuit 842 may use the reference constellation 600 of FIG. 6A to de-map the received symbols from the distortion-compensated signals and thereby recover data transmitted from satellite 300. The baseband processor 840 may then prepare the recovered data for transmission to one or more UEs 500, for example, via UE interface circuitry 450 (see also FIGS. 4-5).

The modulation circuit 844 may receive data from one or more UEs 500, modulate the data onto a baseband signal (e.g., using reference constellation 600), and then provide the modulated data signal to the analog transmitter 820 as transmit data (TX DATA) via the digital transmitter 850.

For the example implementation of FIG. 8A, the analog transmitter 820 is shown to include a digital-to-analog converter (DAC) 821, an LNA 822, an RF filter 823, an I/Q frequency converter 824, a VGA 825, and a PA 826. Digital signals received from digital transmitter 850 are converted to analog signals by the DAC 821, amplified by the LNA 822, and then filtered by RF filter 823. The filtered analog signals are then up-converted (e.g., from the baseband frequency to the carrier frequency) by I/Q frequency converter 824. For example, although not shown in FIG. 8A for simplicity, the I/Q frequency converter 824 may include a first mixer to up-convert the in-phase signal components using the local oscillator signal LO(I), and may include a second mixer to up-convert the quadrature signal components using the local oscillator signal LO(Q). The up-converted signals may be amplified by VGA 825 and PA 826 for transmission to satellite 300 via antenna 860.

For other implementations, one or more components of analog transmitter 820 may be combined and/or omitted. For one example, the VGA 825 and PA 826 may be implemented within a single amplifier circuit. For another example, the RF filter 823 may be replaced with another suitable filter.

Referring to both FIGS. 3 and 8A, although not shown for simplicity, each of the forward paths FP(1)-FP(N) may include a pulse shaping filter (PSF), and the analog receiver 810 may include a channel select filter (CSF). The PSF may distort the APSK signals, prior to amplification by the respective PA 316, due to inter-symbol interference (ISI) caused by the PSF. The CSF in the analog receiver 810 may remove this ISI from the received satellite signals. Thus, for at least some example implementations, the PSF and the CSF may together form a Nyquist filter that reduces the undesirable ISI. Operation of Nyquist filters is well-known, and therefore a detailed description thereof is not provided herein.

As mentioned above, it may be desirable to set or dynamically adjust an operating point of one or more of PAs 316(1)-316(N) to an optimum operating point (e.g., within the operating region 702 depicted in FIG. 7A). Thus, in accordance with example implementations, a user terminal such as UT 400 may transmit a calibration signal to satellite 300. The calibration signal may indicate a target operating point for the PAs 316(1)-316(N), for example, that falls within the operating region 702 depicted in FIG. 7A. For some aspects, the calibration signal may be based at least in part on the correction signal generated by the post-distortion circuit 831. The satellite 300 may use the calibration signal to set and/or dynamically adjust the operating point of one or more of PAs 316(1)-316(N) to the target operating point.

Figure 8B:
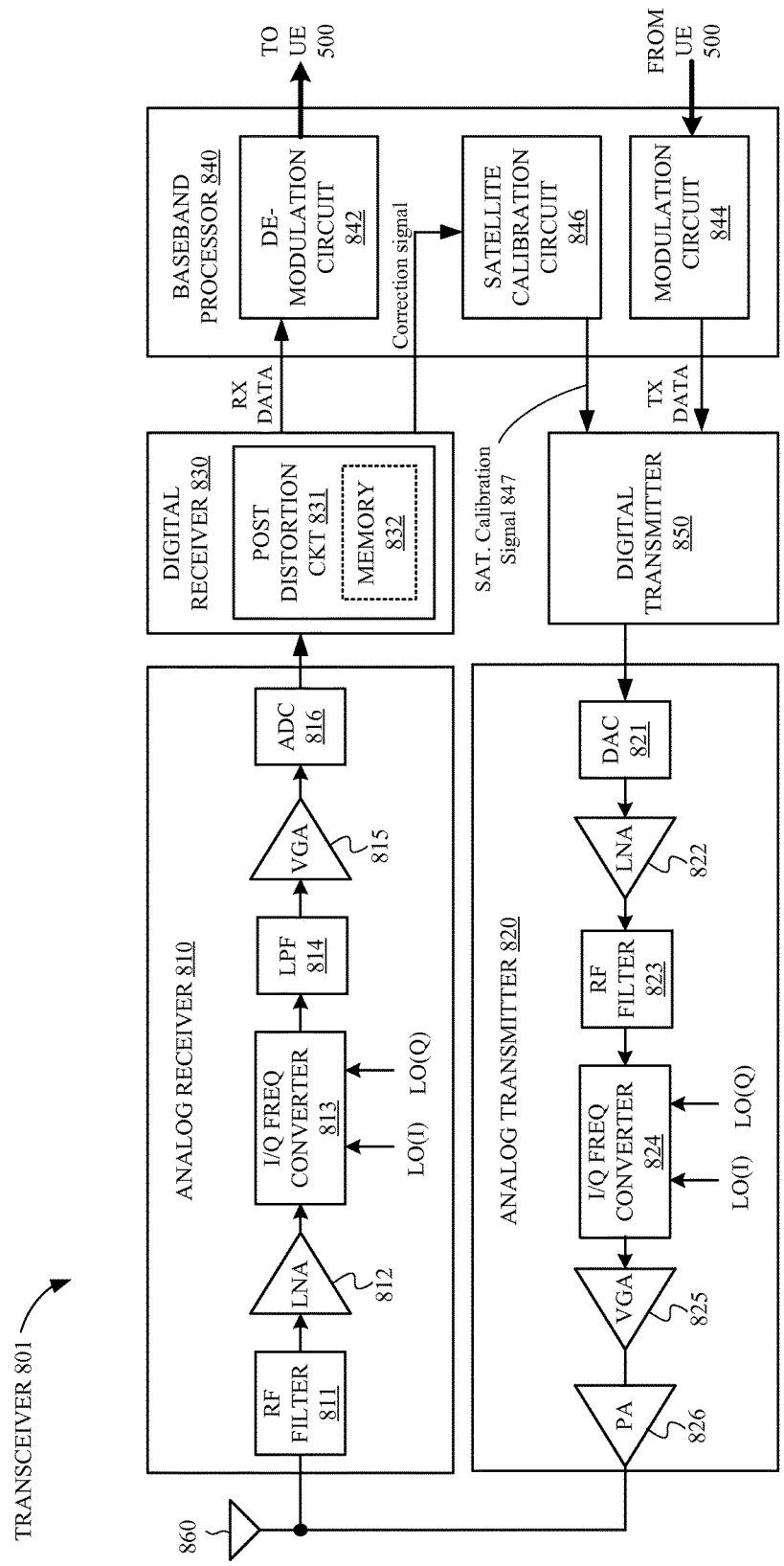
FIG. 8B depicts another example transceiver that may be used within the user terminal of FIG. 4, in accordance with example implementations.

For example, FIG. 8B is a block diagram of a transceiver 801 that may be used within a user terminal such as UT 400 of FIG. 4. The transceiver 801 includes all the components of transceiver 800 of FIG. 8A, except that the baseband processor 840 of FIG. 8B is shown to include a satellite calibration circuit 846. The satellite calibration circuit 846 may receive the correction signal generated by the post-distortion circuit 831, and use the correction signal to generate a satellite calibration signal 847. The satellite calibration signal 847 may be transmitted to satellite 300 via analog transmitter 820 and antenna 860. For some aspects, the satellite calibration signal 847 may be transmitted with the TX DATA to satellite 300. For other aspects, the satellite calibration signal 847 may be transmitted to satellite 300 as a separate control signal. The satellite 300 may use the satellite calibration signal 847 to set and/or dynamically adjust the operating point of one or more of the PAs 316(1)-316(N), for example, to fall within the operating region 702 depicted in FIG. 7A.

Figure 9:
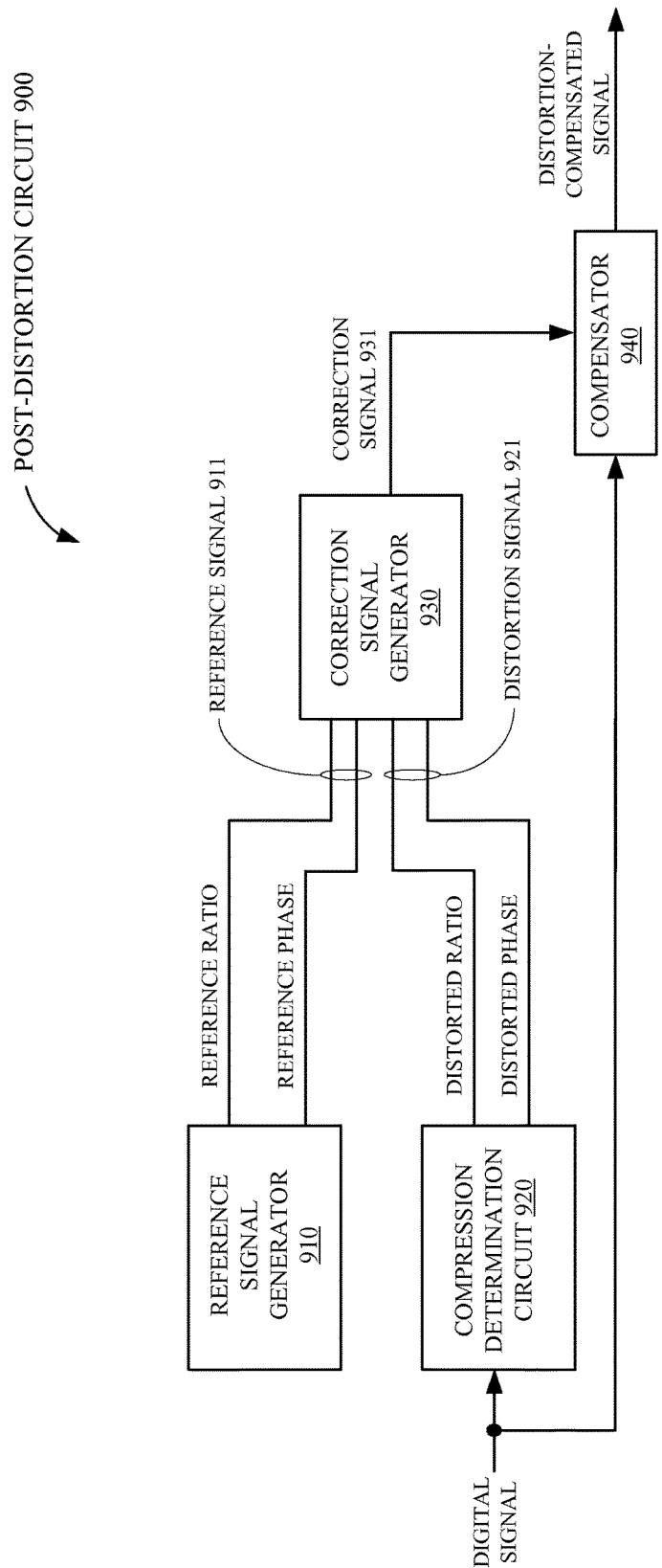
FIG. 9 shows a block diagram of an example post-distortion circuit, in accordance with example implementations.

FIG. 9 depicts a post-distortion circuit 900 that may be one implementation of post-distortion circuit 831 of FIGS. 8A-8B. The post-distortion circuit 900 is shown to include a reference signal generator 910, a compression determination circuit 920, a correction signal generator 930, and a compensator 940. The reference signal generator 910 may generate a reference signal 911 that includes a reference ratio signal component and a reference phase signal component. The reference ratio signal component may indicate the value of the reference ratio, $\gamma_{REF}$, as described above. The reference phase signal component may indicate phase values of the points 601 and 602 of the reference constellation 600 of FIG. 6A. For some implementations, the reference signal 911 may indicate reference ratio information and reference phase information. For example, the reference ratio signal component of the reference signal 911 may indicate reference amplitude values $A_1$-$A_2$ and/or reference radius values $R_1$-$R_2$ associated with the reference constellation 600, and the reference phase signal component of the reference signal 911 may indicate reference phase values for the points 601(1)-601(4) and 602(1)-602(12) of the reference constellation 600 of FIG. 6A.

The compression determination circuit 920 may generate a distortion signal 921 that includes a distorted ratio signal component and a distorted phase signal component. The distorted ratio signal component may indicate the value of the distorted ratio, $\gamma_{DST}$, as described above. The distorted phase signal component may indicate phase values of the points 601' and 602' of the distorted constellation 660 FIG. 6C. Thus, for some implementations, the distortion signal 921 may indicate distorted ratio information and distorted phase information. For example, the distorted ratio signal component of the distortion signal 921 may indicate distorted amplitude values $A_1'$-$A_2'$ and/or distorted radius values $R_1'$-$R_2'$ associated with the distorted constellation 650, and the distorted ratio phase component of the distortion signal 921 may indicate distorted phase values for the points 601(1)-601(4) and 602(1)-602(12) of the distorted constellation 660 of FIG. 6C.

More specifically, the compression determination circuit 920 may receive the digital signal, and may then determine an amount by which the symbols modulated onto the received APSK signals have been compressed and/or rotated. For some implementations, the compression determination circuit 920 may determine, from the digital signal, amplitude values $A_1'$ and $A_2'$ corresponding to symbols mapped to points 601 on the inner circle 610 and to symbols mapped to points 602 on the outer circle 620, respectively, of the distorted constellation 650. The determined amplitude values $A_1'$ and $A_2'$ may be correlated to the radius $R_1'$ of the inner circle 610 and to the radius $R_2'$ of the outer circle 620, respectively, of the distorted constellation 650 of FIG. 6B. The compression determination circuit 920 may determine the value of $R_1'$ based on the magnitudes of the I and Q signal components associated with symbols mapped to the points 601 on the inner circle 610 as $R_1' = \sqrt{I^2+Q^2}$, and may determine the value of $R_2'$ based on the magnitudes of the I and Q signal components associated with symbols mapped to the points 602 on the outer circle 620 as $R_2' = \sqrt{I^2+Q^2}$. The compression determination circuit 920 may then determine the value of the distorted ratio as $\gamma_{DST}=R_2'/R_1'$, and indicate the value of $\gamma_{DST}$ in the distorted ratio signal component.

The compression determination circuit 920 may also determine an amount of phase rotation in the digital signals resulting from non-linear characteristics of the respective PA 316 in satellite 300. As described above with respect to FIG. 6C, the resulting phase distortion may cause the points 601 on the inner circle 610 and the points 602 on the outer circle 620 to undesirably rotate about the constellation I-axis and Q-axis, which in turn may make it more difficult for the UT 400 to determine the phase angles of the received APSK signals. Thus, in accordance with example implementations, the compression determination circuit 920 may also determine the angle of rotation caused by phase distortion, and then indicate the determined angle of rotation in the distorted phase signal component.

The correction signal generator 930 may generate the correction signal 931 based, at least in part, on the reference signal 911 provided by the reference signal generator 910 and the distortion signal 921 provided by the compression determination circuit 920. The correction signal 931 may include a first signal component that indicates an amount of amplitude distortion of the received signal, and may include a second signal component that indicates an amount of phase distortion of the received signal.

More specifically, for some implementations, the correction signal generator 930 may generate an amplitude correction signal based on a comparison between the reference ratio ($\gamma_{REF}$) and the distorted ratio ($\gamma_{DST}$), and may generate a phase correction signal based on a comparison between the reference phase signal and the distorted phase signal. The amplitude correction signal and the phase correction signal may together form the correction signal 931. For at least some example implementations, the correction signal 931 may be a signal of the form $y(t)=x(t)*[\rho e^{i\theta}]$, where $x(t)$ may denote the amplitude component and $\rho e^{i\theta}$ may denote the phase component of the correction signal $y(t)$.

The correction signal 931 and the received digital signal are mixed together (e.g., combined) in the compensator 940 to generate the distortion-compensated signal. More specifically, mixing the correction signal 931 with the digital signal may adjust the amplitude (e.g., the radius R of the constellation points) and/or may adjust the phase (e.g., the angle Φ of the constellation points) of the received digital signal. For example, if the received digital signal carries a symbol mapped to the points 601 on the inner circle 610, then the correction signal 931 may adjust the amplitude of the digital signal by a first amount corresponding to a difference between $R_1$ and $R_1'$; if the received digital signal carries a symbol mapped to the points 602 on the outer circle 620, then the correction signal 931 may adjust the amplitude of the digital signal by a second amount corresponding to a difference between $R_2$ and $R_2'$. In other words, if the amplitude of the received digital signal is within a first range corresponding to the points 601, then the amplitude may be increased by the first amount; if the amplitude of the received digital signal is within a second range corresponding to the points 602, then the amplitude may be increased by the second amount. The correction signal 931 may also adjust the phase of the digital signal by an amount indicated by the phase adjustment signal for symbols mapped to either the points 601 on the inner circle 610 or the points 602 on the outer circle 620 of the constellation 600.

In some aspects, the compensator 940 may adjust the amplitude of the digital signal by adjusting a gain of the digital signal, and may adjust the phase of the digital signal by delaying the digital signal.

It is noted that the post-distortion techniques described herein with respect to the example implementations do not need to employ Volterra expansions to linearize signals received from satellite 300. This may be advantageous because the use of Volterra expansions for post-distortion reduction may consume more processing resources than are available within user terminals such as UT 400. For example, although Volterra expansions may be used for post-distortion reduction of LTE signals, Volterra expansions are not well-suited for post-distortion reduction of received satellite signals, for example, because satellite signals typically have a bandwidth that is an order of magnitude greater than LTE signals (e.g., 250 MHz bandwidth for satellite signals versus 20 MHz bandwidth for LTE signals).

Figure 10:
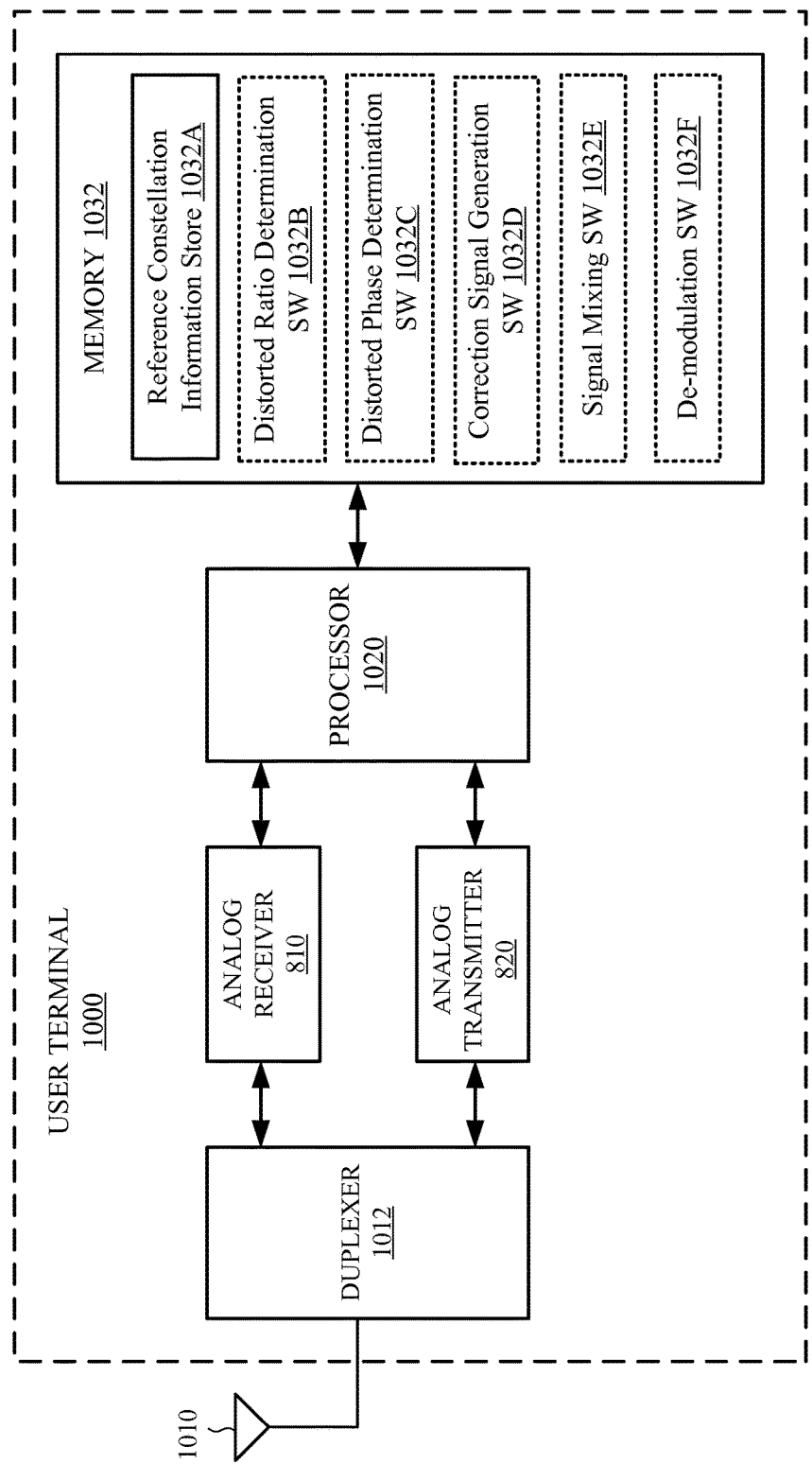
FIG. 10 shows a block diagram of an example user terminal, in accordance with example implementations.

FIG. 10 is a block diagram of a user terminal 1000 in accordance with example implementations. For purposes of discussion herein, the user terminal 1000 may be one implementation of the user terminal 400 of FIG. 4, may include transceiver 800 of FIG. 8A or analog receiver 810 of FIG. 8B, and/or may include the post-distortion circuit 900 of FIG. 9.

The user terminal 1000 includes at least an antenna 1010, a duplexer 1012, analog receiver 810, analog transmitter 820, a processor 1020, and a memory 1032. The antenna 1010 may be one example of antenna 410 of FIG. 4, the duplexer 1012 may be one example of duplexer 412 of FIG. 4, the processor 1020 may be one example of control processor 420 of FIG. 4, and the memory 1032 may be one example of memory 432 of FIG. 4. The memory 1032 may include a reference constellation information store 1032A to store radius information, radius ratio information, amplitude values, and/or phase values associated with the reference constellation 600 of FIG. 6A.

Figure 11:
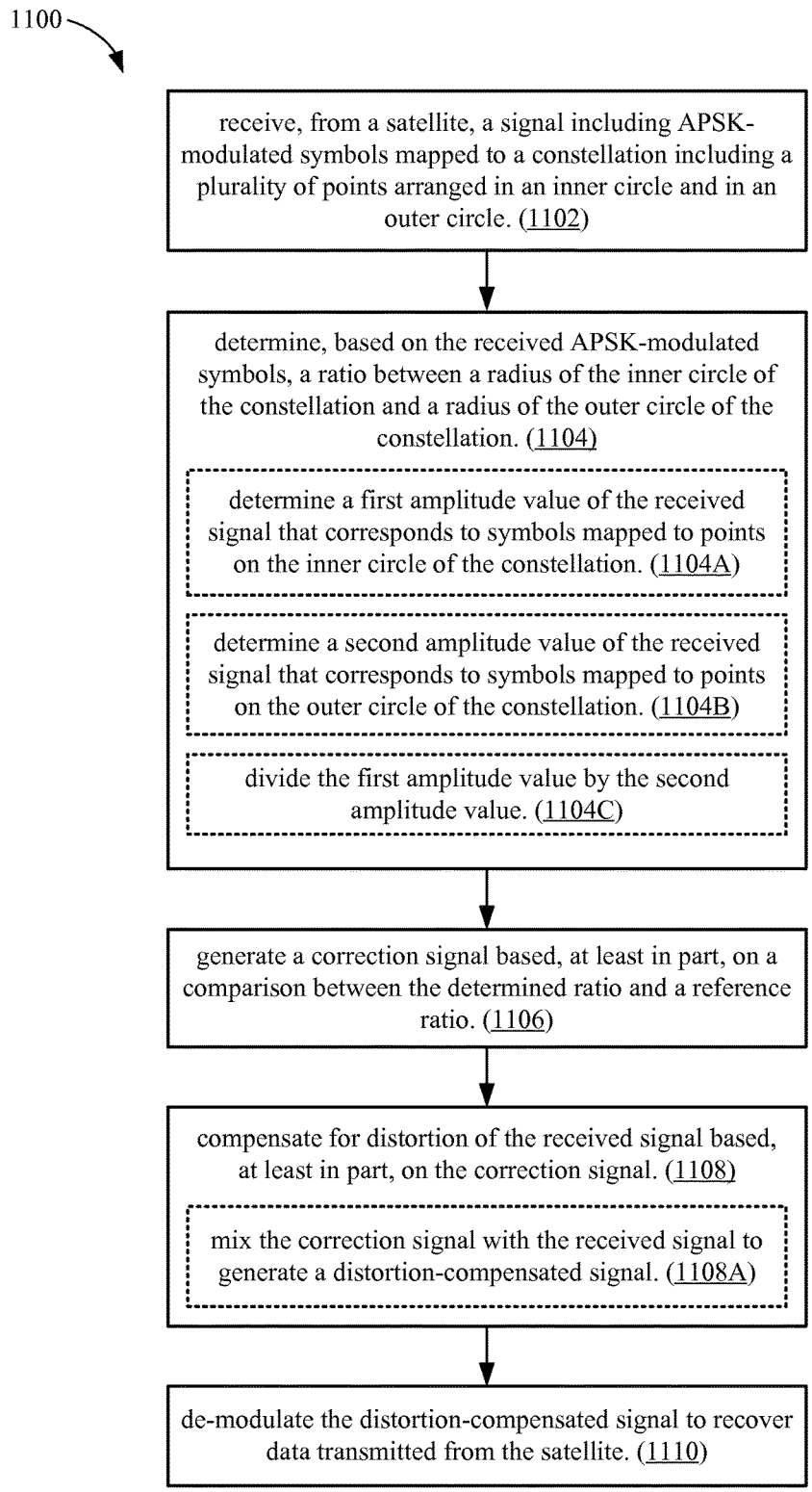
FIG. 11 shows an illustrative flowchart depicting an example operation for post-distortion compensation of a received satellite signal, in accordance with example implementations.
Figure 12:
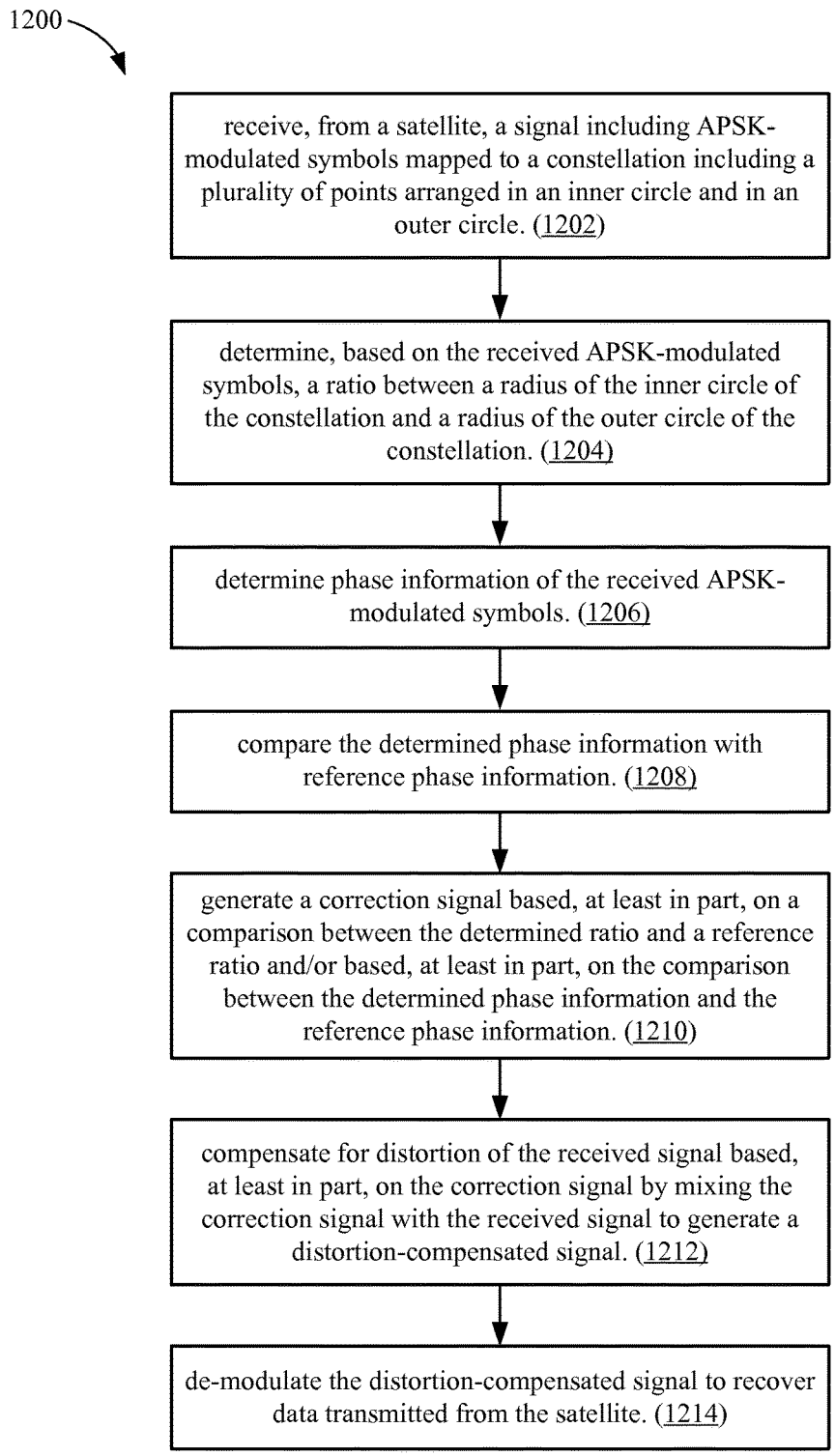
FIG. 12 shows an illustrative flowchart depicting another example operation for post-distortion compensation of a received satellite signal, in accordance with example implementations.

The memory 1032 may include a non-transitory computer-readable storage medium (e.g., one or more nonvolatile memory elements, such as EPROM, EEPROM, Flash memory, a hard drive, and so on) that may store the following software modules (SW):

- a distorted ratio determination SW module 1032B to determine the distorted ratio ($\gamma_{DST}$) associated with the distorted constellation 650 of FIG. 6B (e.g., to determine an amount by which the amplitude values $A_1'$ and $A_2'$ of the received signals differ from the expected amplitude values $A_1$ and $A_2$, respectively), for example, as described for one or more operations of FIGS. 11 and 12;
- a distorted phase determination SW module 1032C to determine the distorted phases of symbols mapped to the distorted constellation 660 of FIG. 6C (e.g., to determine an angle of rotation of the constellation caused by amplifier distortion in the satellite 300), for example, as described for one or more operations of FIGS. 11 and 12;
- a correction signal generation SW module 1032D to generate the correction signal 931 based, at least in part, on a comparison between the determined distorted ratio and a reference ratio and/or based, at least in part, on a comparison between the distorted phase information and the reference phase information, for example, as described for one or more operations of FIGS. 11 and 12;
- a signal mixing SW module 1032E to generate the distortion-compensated signal based, at least in part, on a combination of the received satellite signal and the correction signal 931, for example, as described for one or more operations of FIGS. 11 and 12; and
- a de-modulation SW module 1032F to de-modulate the distortion-compensated signal to recover data transmitted from the satellite 300, for example, as described for one or more operations of FIGS. 11 and 12.

Each software module includes instructions that, when executed by processor 1020, cause the user terminal 1000 to perform the corresponding functions. The non-transitory computer-readable medium of memory 1032 thus includes instructions for performing all or a portion of the operations of FIGS. 11 and 12.

Processor 1020 may be any suitable one or more processors capable of executing scripts or instructions of one or more software programs stored in user terminal 1000 (e.g., within memory 1032). For example, processor 1020 may execute reference constellation information store 1031 to store radius information, radius ratio information, amplitude values, and/or phase values associated with the reference constellation 600 of FIG. 6A. Processor 1020 may execute distorted ratio determination SW module 1032B to determine the distorted ratio ($\gamma_{DST}$) associated with the distorted constellation 650 of FIG. 6B (e.g., to determine an amount by which the amplitude values $A_1'$ and $A_2'$ of the received signal differ from the expected amplitude values $A_1$ and $A_2$, respectively). Processor 1020 may execute distorted phase determination SW module 1032C to determine the distorted phases of symbols mapped to the distorted constellation 660 of FIG. 6C (e.g., to determine an angle of rotation of the constellation caused by amplifier distortion in the satellite 300). Processor 1020 may execute correction signal generation SW module 1032D to generate the correction signal 931 based, at least in part, on the comparison between the determined ratio and a reference ratio and/or based, at least in part, on the comparison between the determined phase information and the reference phase information. Processor 1020 may execute the signal mixing SW module 1032E to generate the distortion-compensated signal based, at least in part, on a combination of the received satellite signal and the correction signal 931. Processor 1020 may execute the de-modulation SW module 1032F to de-modulate the distortion-compensated signal to recover data transmitted from the satellite 300.

FIG. 11 is an illustrative flow chart depicting an example operation 1100 for reducing amplitude distortion of APSK signals received from satellite 300. The example operation 1100 may be performed by the user terminal (UT) 1000 depicted in FIG. 10. First, the UT 1000 receives, from the satellite 300, a signal including APSK-modulated symbols mapped to a constellation including a plurality of points arranged in an inner circle and in an outer circle (1102). For some implementations, the UT 1000 may receive the signal from the satellite 300 using analog receiver 810 of FIG. 8A. Then, the UT 1000 determines, based on the received APSK-modulated symbols, a ratio between a radius of the inner circle of the constellation and a radius of the outer circle of the constellation (1104). For some implementations, the UT 1000 may determine the ratio by executing the distorted ratio determination SW module 1032B of FIG. 10. For other implementations, the UT 1000 may determine the ratio using the compression determination circuit 920 of FIG. 9.

More specifically, the UT 1000 may determine the ratio by determining a first amplitude value of the received signal that corresponds to symbols mapped to points on the inner circle of the constellation (1104A), by determining a second amplitude value of the received signal that corresponds to symbols mapped to points on the outer circle of the constellation (1104B), and dividing the first amplitude value by the second amplitude value (1104C). For some implementations, the UT 1000 may determine the first amplitude value of the received signal, may determine the second amplitude value of the received signal, and may divide the first amplitude value by the second amplitude value using post-distortion circuit 831 of FIG. 8A and/or by executing the distorted ratio determination SW module 1032C of FIG. 10.

Next, the UT 1000 generates a correction signal based, at least in part, on a comparison between the determined ratio and a reference ratio (1106). For some implementations, the UT 1000 may generate the correction signal by executing the correction signal generation SW module 1032D of FIG. 10. For other implementations, the UT 1000 may generate the correction signal using the correction signal generator 930 of FIG. 9.

Then, the UT 1000 may compensate for amplitude distortion of the received signal based, at least in part, on the correction signal (1108). The UT 1000 may compensate for amplitude distortion of the received signal by mixing the correction signal with the received signal to generate a distortion-compensated signal (1108A). For some implementations, the UT 1000 may compensate for amplitude distortion of the received signal by executing the signal mixing SW module 1032E of FIG. 10. For other implementations, the UT 1000 may compensate for amplitude distortion of the received signal using the compensator 940 of FIG. 9.

Then, the UT 1000 may de-modulate the distortion-compensated signal to recover data transmitted from the satellite 300 (1110). For some implementations, the UT 1000 may de-modulate the distortion-compensated signal by executing the de-modulation SW module 1032F of FIG. 10. For other implementations, the UT 1000 may de-modulate the distortion-compensated signal using the de-modulation circuit 842 of FIG. 8A.

FIG. 12 is an illustrative flow chart depicting another example operation 1200 for reducing both amplitude and phase distortion of APSK signals received from satellite 300. The example operation 1200 may be performed by the user terminal (UT) 1000 depicted in FIG. 10. First, the UT 1000 receives, from the satellite 300, a signal including APSK-modulated symbols mapped to a constellation including a plurality of points arranged in an inner circle and in an outer circle (1202). For some implementations, the UT 1000 may receive the signal from the satellite 300 using analog receiver 810 of FIG. 8A. The UT 1000 may determine, based on the received APSK-modulated symbols, a ratio between a radius of the inner circle of the constellation and a radius of the outer circle of the constellation (1204). For some implementations, the UT 1000 may determine the ratio by executing the distorted ratio determination SW module 1032B of FIG. 10. For other implementations, the UT 1000 may determine the ratio using the compression determination circuit 920 of FIG. 9

Then, the UT 1000 may determine phase information of the received APSK-modulated symbols (1206), and may compare the determined phase information with reference phase information (1208). For some implementations, the UT 1000 may determine the distorted phase information of the received APSK-modulated symbols by executing the distorted phase determination SW module 1032C of FIG. 10. For other implementations, the UT 1000 may determine the phase information of the received APSK-modulated symbols using the compression determination circuit 920 of FIG. 9.

Next, the UT 1000 may generate a correction signal based, at least in part, on a comparison between the determined ratio and a reference ratio and/or based, at least in part, on a comparison between the determined distorted phase information and the reference phase information (1210). For some implementations, the UT 1000 may generate the correction signal by executing the correction signal generation SW module 1032D of FIG. 10. For other implementations, the UT 1000 may generate the correction signal using the correction signal generator 930 of FIG. 9.

Then, the UT 1000 may compensate for amplitude and phase distortion of the received signal based, at least in part, on the correction signal (1212). For some implementations, the UT 1000 may compensate for amplitude and phase distortion of the received signal by executing the signal mixing SW module 1032E of FIG. 10. For other implementations, the UT 1000 may compensate for amplitude and phase distortion of the received signal using the compensator 940 of FIG. 9.

Then, the UT 1000 may de-modulate the distortion-compensated signal to recover data transmitted from the satellite 300 (1214). For some implementations, the UT 1000 may de-modulate the distortion-compensated signal by executing the de-modulation SW module 1032F of FIG. 10. For other implementations, the UT 1000 may de-modulate the distortion-compensated signal using the de-modulation circuit 842 of FIG. 8A.

Figure 13:
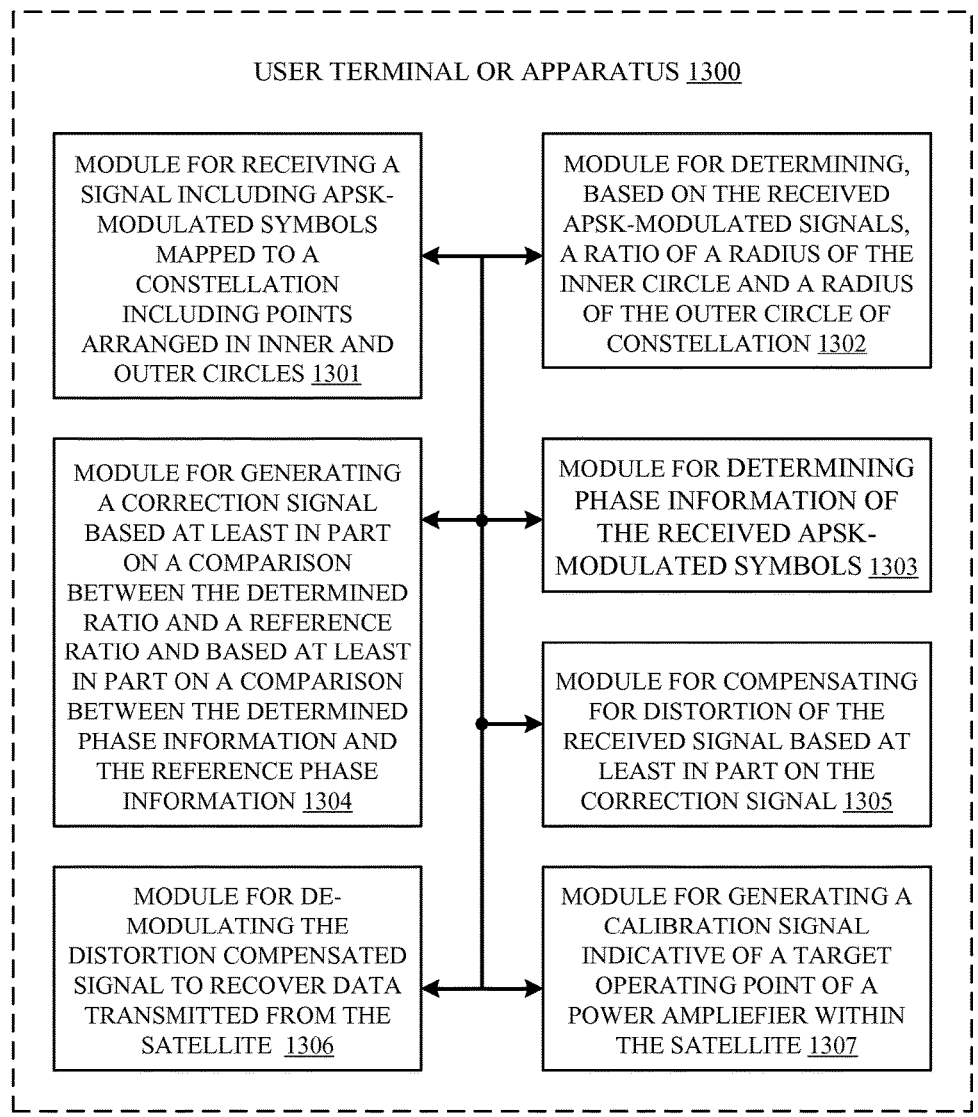
FIG. 13 is another block diagram of several sample aspects of apparatuses configured to compensate for distortion associated with a received satellite signal as taught herein.

FIG. 13 shows an example satellite or apparatus 1300 represented as a series of interrelated functional modules. A module 1301 for receiving a signal including APSK-modulated symbols mapped to a constellation including a plurality of points arranged in an inner circle and in an outer circle may correspond at least in some aspects to, for example, a processor as discussed herein (e.g., processor 1020). A module 1302 for determining, based on the received APSK-modulated symbols, a ratio between a radius of the inner circle of the constellation and a radius of the outer circle of the constellation may correspond at least in some aspects to, for example, a processor as discussed herein (e.g., processor 1020). A module 1303 for determining phase information of the received APSK-modulated symbols may correspond at least in some aspects to, for example, a processor as discussed herein (e.g., processor 1020). A module 1304 for generating a correction signal based, at least in part, on a comparison between the determined ratio and a reference ratio and based, at least in part, on the comparison between the determined phase information and the reference phase information may correspond at least in some aspects to, for example, a processor as discussed herein (e.g., processor 1020). A module 1305 for compensating for distortion of the received signal based, at least in part, on the correction signal may correspond at least in some aspects to, for example, a processor as discussed herein (e.g., processor 1020). A module 1306 for de-modulating the distortion-compensated signal to recover data transmitted from the satellite may correspond at least in some aspects to, for example, a processor as discussed herein (e.g., processor 1020). A module 1307 for generating a calibration signal indicative of a target operating point of a power amplifier within the satellite may correspond at least in some aspects to, for example, a processor as discussed herein (e.g., processor 1020).

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for reducing distortion of satellite signals modulated using amplitude phase shift keying (APSK), the method performed by a receiver and comprising:

receiving, from a satellite, a signal including APSK-modulated symbols mapped to a constellation including a plurality of points arranged in an inner circle and in an outer circle;

determining, based on the received APSK-modulated symbols, a ratio between a radius of the inner circle of the constellation and a radius of the outer circle of the constellation;

generating a correction signal based, at least in part, on a comparison between the determined ratio and a reference ratio; and compensating for distortion of the received signal based, at least in part, on the correction signal.

2. The method of claim 1, wherein determining the ratio comprises:

determining a first amplitude value of the received signal that corresponds to symbols mapped to points on the inner circle of the constellation;

determining a second amplitude value of the received signal that corresponds to symbols mapped to points on the outer circle of the constellation; and dividing the second amplitude value by the first amplitude value.

3. The method of claim 1, wherein the reference ratio is known to the receiver and indicates an expected ratio of the radius of the inner circle and the radius of the outer circle.

4. The method of claim 1, wherein the correction signal indicates an operating point of a power amplifier within the satellite.

5. The method of claim 1, wherein the compensating comprises:

mixing the correction signal with the received signal to generate a distortion-compensated signal.

6. The method of claim 5, further comprising:

de-modulating the distortion-compensated signal to recover data transmitted from the satellite.

7. The method of claim 1, wherein generating the correction signal further comprises:

determining phase information of the received APSK-modulated symbols; and comparing the determined phase information with reference phase information, the correction signal further based, at least in part, on the comparison between the determined phase information and the reference phase information.

8. The method of claim 7, wherein the correction signal comprises a first signal component indicating an amount of amplitude distortion of the received signal, and a second signal component indicating an amount of phase distortion of the received signal.

9. The method of claim 1, further comprising:

generating a calibration signal indicative of a target operating point of at least one power amplifier within the satellite; and transmitting the calibration signal to the satellite, the calibration signal instructing the satellite to adjust an operating point of the at least one power amplifier.

10. A user terminal for reducing distortion of satellite signals modulated using amplitude phase shift keying (APSK), the user terminal comprising:

one or more processors; and a memory configured to store instructions that, when executed by the one or more processors, cause the user terminal to:

receive, from a satellite, a signal including APSK-modulated symbols mapped to a constellation including a plurality of points arranged in an inner circle and in an outer circle;
determine, based on the received APSK-modulated symbols, a ratio between a radius of the inner circle of the constellation and a radius of the outer circle of the constellation;
generate a correction signal based, at least in part, on a comparison between the determined ratio and a reference ratio; and
compensate for distortion of the received signal based, at least in part, on the correction signal.

11. The user terminal of claim 10, wherein execution of the instructions to determine the ratio causes the user terminal to:
determine a first amplitude value of the received signal that corresponds to symbols mapped to points on the inner circle of the constellation;
determine a second amplitude value of the received signal that corresponds to symbols mapped to points on the outer circle of the constellation; and
divide the first amplitude value by the second amplitude value.

12. The user terminal of claim 10, wherein the reference ratio is known to the user terminal and indicates an expected ratio of the radius of the inner circle and the radius of the outer circle.

13. The user terminal of claim 10, wherein the correction signal indicates an operating point of a power amplifier within the satellite.

14. The user terminal of claim 10, wherein execution of the instructions to compensate for the distortion causes the user terminal to:
mix the correction signal with the received signal to generate a distortion-compensated signal.

15. The user terminal of claim 14, further comprising instructions that, when executed by the one or more processors, cause the user terminal to:
de-modulate the distortion-compensated signal to recover data transmitted from the satellite.

16. The user terminal of claim 10, wherein execution of the instructions to generate the correction signal causes the user terminal to:
determine phase information of the received APSK-modulated symbols; and
compare the determined phase information with reference phase information, the correction signal further based, at least in part, on the comparison between the determined phase information and the reference phase information.

17. The user terminal of claim 16, wherein the correction signal comprises a first signal component indicating an amount of amplitude distortion of the received signal, and a second signal component indicating an amount of phase distortion of the received signal.

18. A user terminal for reducing distortion of satellite signals modulated using amplitude phase shift keying (APSK), the user terminal comprising:
means for receiving, from a satellite, a signal including APSK-modulated symbols mapped to a constellation including a plurality of points arranged in an inner circle and in an outer circle;
means for determining, based on the received APSK-modulated symbols, a ratio between a radius of the inner circle of the constellation and a radius of the outer circle of the constellation;
means for generating a correction signal based, at least in part, on a comparison between the determined ratio and a reference ratio; and
means for compensating for distortion of the received signal based, at least in part, on the correction signal.

19. The user terminal of claim 18, wherein the means for determining the ratio is to:
determine a first amplitude value of the received signal that corresponds to symbols mapped to points on the inner circle of the constellation;
determine a second amplitude value of the received signal that corresponds to symbols mapped to points on the outer circle of the constellation; and
divide the first amplitude value by the second amplitude value.

20. The user terminal of claim 18, wherein the reference ratio is known to the user terminal and indicates an expected ratio of the radius of the inner circle and the radius of the outer circle.

21. The user terminal of claim 18, wherein the means for compensating is to:
mix the correction signal with the received signal to generate a distortion-compensated signal.

22. The user terminal of claim 21, further comprising:
means for de-modulating the distortion-compensated signal to recover data transmitted from the satellite.

23. The user terminal of claim 18, wherein the means for generating the correction signal is to further:
determine phase information of the received APSK-modulated symbols; and
compare the determined phase information with reference phase information, the correction signal further based, at least in part, on the comparison between the determined phase information and the reference phase information.

24. The user terminal of claim 23, wherein the correction signal comprises a first signal component indicating an amount of amplitude distortion of the received signal, and a second signal component indicating an amount of phase distortion of the received signal.

25. A non-transitory computer-readable medium storing instructions that, when executed by one or more processors of a user terminal, cause the user terminal to reduce distortion of satellite signals modulated using amplitude phase shift keying (APSK) by performing operations comprising:
receiving, from a satellite, a signal including APSK-modulated symbols mapped to a constellation including a plurality of points arranged in an inner circle and in an outer circle;
determining, based on the received APSK-modulated symbols, a ratio between a radius of the inner circle of the constellation and a radius of the outer circle of the constellation;
generating a correction signal based, at least in part, on a comparison between the determined ratio and a reference ratio; and
compensating for distortion of the received signal based, at least in part, on the correction signal.

26. The non-transitory computer-readable medium of claim 25, wherein the reference ratio is known to the receiver and indicates an expected ratio of the radius of the inner circle and the radius of the outer circle.

27. The non-transitory computer-readable medium of claim 25, wherein the correction signal indicates an operating point of a power amplifier within the satellite.

28. The non-transitory computer-readable medium of claim 25, wherein execution of the instructions to compensate causes the user terminal to perform operations further comprising:
 mixing the correction signal with the received signal to generate a distortion-compensated signal.

29. The non-transitory computer-readable medium of claim 28, wherein execution of the instructions causes the user terminal to perform operations further comprising:
 de-modulating the distortion-compensated signal to recover data transmitted from the satellite.

30. The non-transitory computer-readable medium of claim 25, wherein execution of the instructions to generate the correction signal causes the user terminal to perform operations further comprising:
 determining phase information of the received APSK-modulated symbols; and
 comparing the determined phase information with reference phase information, the correction signal further based, at least in part, on the comparison between the determined phase information and the reference phase information.

\* \* \* \* \*